United States Patent
Sabbah et al.

(10) Patent No.: US 12,479,747 B2
(45) Date of Patent: Nov. 25, 2025

(54) SYSTEM AND METHOD FOR REMOVING MICROPARTICLES AND NANOPARTICLES FROM WATER USING GELATINOUS ZOOPLANKTON MUCUS

(71) Applicants: OFEK ESHKOLOT RESEARCH AND DEVELOPMENT LTD., Karmiel (IL); CARMEL HAIFA UNIVERSITY ECONOMIC CORPORATION LTD., Haifa (IL); SINTEF OCEAN AS, Trondheim (NO); UNIVERSITY OF SOUTHERN DENMARK, Odense M (DK)

(72) Inventors: Isam Sabbah, Shefa-Am (IL); Eric A. Ben David, Karmiel (IL); Elias Haddad, Haifa (IL); Maryana Habibi, Kfar-Yasif (IL); Hila Dror, Ra'anana (IL); Dror Angel, Moshav Shorashim (IL); Andrew M. Booth, Trondheim (NO); Jamileh Javidpour, Altenholz (DE)

(73) Assignees: OFEK ESHKOLOT RESEARCH AND DEVELOPMENT LTD., Karmiel (IL); CARMEL HAIFA UNIVERSITY ECONOMIC CORPORATION LTD., Haifa (IL); SINTEF OCEAN AS, Trondheim (NO); UNIVERSITY OF SOUTHERN DENMARK, Odense M (DK)

( * ) Notice: Subject to any disclaimer, the term of this patent is extended or adjusted under 35 U.S.C. 154(b) by 378 days.

(21) Appl. No.: 18/036,985

(22) PCT Filed: Nov. 16, 2021

(86) PCT No.: PCT/IL2021/051360
§ 371 (c)(1),
(2) Date: May 15, 2023

(87) PCT Pub. No.: WO2022/107129
PCT Pub. Date: May 27, 2022

(65) Prior Publication Data
US 2023/0416126 A1 Dec. 28, 2023

Related U.S. Application Data

(60) Provisional application No. 63/114,808, filed on Nov. 17, 2020.

(51) Int. Cl.
C02F 3/32 (2023.01)
B01D 21/00 (2006.01)
(Continued)

(52) U.S. Cl.
CPC .......... C02F 3/327 (2013.01); B01D 21/0012 (2013.01); B01D 21/01 (2013.01);
(Continued)

(58) Field of Classification Search
CPC ........ C02F 3/327; C02F 1/004; C02F 1/5245; C02F 1/5263; C02F 2101/30;
(Continued)

(56) References Cited

U.S. PATENT DOCUMENTS 7,943,049 B1  5/2011  Alcantar et al.

FOREIGN PATENT DOCUMENTS

CN  101254956 A  9/2008
WO  02094722 A1  11/2002

OTHER PUBLICATIONS

Machine-generated English translation of CN 101254956, generated on Jul. 9, 2025.*

(Continued)

*Primary Examiner* — Fred Prince
(74) *Attorney, Agent, or Firm* — The Roy Gross Law Firm, LLC; Roy Gross

(57) ABSTRACT

A method for removing particles from water, the method comprising: supplying gelatinous zooplankton mucus to water comprising particles; allowing formation of particle aggregates in the water by allowing interaction between the particles in the water and the gelatinous zooplankton mucus;

(Continued)

removing the particle aggregates from the water by passing the water comprising particle aggregates through a filter configured to receive water comprising particle aggregates and further filter the water; and exiting filtered water from the filter. A system for removing particles from water with the aforementioned method is also provided. Additional embodiments of the system and method for removing particles from water are disclosed herein.

20 Claims, 15 Drawing Sheets

(51) Int. Cl.
  B01D 21/01 (2006.01)
  B03D 3/00 (2006.01)
  C02F 1/00 (2023.01)
  C02F 1/52 (2023.01)
  C02F 101/30 (2006.01)
  C02F 103/08 (2006.01)
  C02F 103/34 (2006.01)

(52) U.S. Cl.
  CPC ............... B03D 3/00 (2013.01); C02F 1/004 (2013.01); C02F 1/5245 (2013.01); C02F 1/5263 (2013.01); *C02F 2101/30* (2013.01); *C02F 2103/08* (2013.01); *C02F 2103/343* (2013.01)

(58) Field of Classification Search
  CPC ........... C02F 2103/08; C02F 2103/343; B01D 21/0012; B01D 21/01; B03D 3/00
  USPC ................................................. 210/602, 631
  See application file for complete search history.

(56) References Cited

OTHER PUBLICATIONS

Hamner, W.M. et al. Underwater observations of gelatinous zooplankton: Sampling problems, feeding biology, and behavior. Limnology and Oceanography, US , (1975), vol. 20, No. 6, doi: 10.4319/lo.1975.20.6.0907, ISSN 0024-3590, pp. 907-917.
Gemmell, B.J. et al. Can gelantinous zooplankton influence the rate of crude oil in marine environments? https://doi.org/10.1016/j.marpolbul.2016.08.065.
Ajao, V. et al. Natural flocculants from fresh and saline wastewater: Comparative properties and flocculation performances. Chemical Engeneering Journal, vol. 349, doi: 10.1016/j.cej.2018.05.123, ISSN 1385-8947, pp. 622-632.
Nowack, B. et al. Occurrence, behavior and effects of nanoparticles in the environment. Environmental Pollution, vol. 150, Issue 1,2007, pp. 5-22, ISSN 0269-7491, https://doi.org/10.1016/j.envpol.2007.06.006.
Cole, M. et al. Microplastics as contaminants in the marine environment: A review. Marine Pollution Bulletin, vol. 62, Issue 12, 2011, pp. 2588-2597, ISSN 0025-326X, https://doi.org/10.1016/j.marpolbul.2011.09.025.
Hollman, P.C.H. et al.(2013) Microplastics in aquatic food chain: Sources, measurement, occurrence and potential health risks.
Frias, J.P.G.L. et al. Microplastics: Finding a consensus on the definition. Mar Pollut Bull. Jan. 2019;138:145-147. doi: 10.1016/j.marpolbul.2018.11.022. Epub Nov. 22, 2018. PMID: 30660255.
Hartman, N.B. et al. Are we speaking the same language? Recommendations for a definition and categorization framework for plastic debris. Environ Sci Technol. Feb. 5, 2019;53(3):1039-1047. doi: 10.1021/acs.est.8b05297. Epub Jan. 17, 2019. PMID: 30608663.
Nguyen, B. et al. Separation and analysis of microplastics and nanoplastics in complex environmental samples. Acc Chem Res. Apr. 16, 2019;52(4):858-866. doi: 10.1021/acs.accounts.8b00602. Epub Mar. 29, 2019. PMID: 30925038.
Auffan et al. Towards a definition of inorganic nanoparticles from an environmental, health and safety perspective. Nature Nanotechnology, 4, 634-641. https://doi.org/10.1038/nnano.2009.242 (2009).
Thompson et al. (2009). Plastics, the environment and human health: current consensus and future trends, Phil. Trans. R. Soc. B3642153-2166, http://doi.org/10.1098/rstb.2009.0053.
Engler (2012). The Complex Interaction between Marine Debris and Toxic Chemicals in the Ocean. Environ. Sci. Technol. 2012, 46, 22, 12302-12315, Oct. 22, 2012, https://doi.org/10.1021/es3027105.
Chae, Y. et al. Effects of micro- and nanoplastics on aquatic ecosystems: Current Research trends and perspectives. Marine Pollution Bulletin, vol. 124, Issue 2, 2017, pp. 624-632, ISSN 0025-326X, https://doi.org/10.1016/j.marpolbul.2017.01.070.
Shen, M. et al. Micro(nano)plastics: Unignorable vectors for organisms. Micro(nano)plastics: Unignorable vectors for organisms. Mar Pollut Bull. Feb. 2019;139:328-331. doi: 10.1016/j.marpolbul.2019.01.004. Epub Jan. 9, 2019. PMID: 30686434.
Kay, P. et al. Wastewater treatment plants as a source of microplastics in river catchments. Environ Sci Pollut Res 25, 20264-20267 (2018). https://doi.org/10.1007/s11356-018-2070-7.
Carr, S.A. et al. Transport and fate of microplastic particles in wastewater treatment plants. Water Res. Mar. 15, 2016;91:174-82. doi: 10.1016/j.watres.2016.01.002. Epub Jan. 7, 2016. PMID: 26795302.
Duis, K. et al. Microplastics in the aquatic and terrestrial environment: sources (with a specific focus on personal care products), fate and effects. Environ Sci Eur 28, 2 (2016). https://doi.org/10.1186/s12302-015-0069-y.
Ben-David, E.A. Microplastic distributions in a domestic wastewater treatment plant: Removal efficiency, seasonal variation and influence of sampling technique. Sci Total Environ. Jan. 15, 2021;752:141880. doi: 10.1016/j.scitotenv.2020.141880. Epub Aug. 22, 2020. PMID: 32892046.
Verschoor, A.J. et al. Quick Scan and Prioritization of Microplastic Sources and Emissions, RIVM Letter report, 156, pp. 1-41, (2014).
Peiponen, K.E. et al. Outlook on optical identification of micro and nanoplastics in aquatic environments. Chemosphere. Jan. 2019;214:424-429. doi: 10.1016/j.chemosphere.2018.09.111. Epub Sep. 20, 2018. PMID: 30273875.
Shen, M. et al. Recent advances in toxicological research of nanoplastics in the environment: A review. Environmental Pollution, vol. 252, Part A, 2019, pp. 511-521, ISSN 0269-7491, https://doi.org/10.1016/j.envpol.2019.05.102.
Chen, Z. et al. Sedimentation of nanoplastics from water with Ca/Al dual flocculants: Characterization, interface reaction, effects of pH and ion ratios. Chemosphere, vol. 252, 2020, 126450, ISSN 0045-6535, https://doi.org/10.1016/j.chemosphere.2020.126450.
Letterman, Amirtharajah, & O'Melia, Chapter 6: Coagulation and Flocculation, in Water Quality and Treatment—A Handbook of Community Water Supplies, 5th ed.; Letterman, R. D., Ed.; American Water Works Association, (1999).
Dotto, J. et al. Performance of different coagulants in the coagulation/flocculation process of textile wastewater. Journal of Cleaner Production, vol. 208, 2019, pp. 656-665, ISSN 0959-6526, https://doi.org/10.1016/j.iclepro.2018.10.112.
Teuten, E.L. et al. (2009). Transport and release of chemicals from plastics to the environment and to wildlife. Philos Trans R Soc Lond B Biol Sci. Jul. 27, 2009;364(1526):2027-45. doi: 10.1098/rstb.2008.0284. PMID: 19528054; PMCID: PMC2873017.
Lithner, D. et al. (2009). Leachates from plastic consumer products—Screening for toxicity with Daphnia magna, Chemosphere, vol. 74, Issue 9, 2009, pp. 1195-1200, ISSN 0045-6535, https://doi.org/10.1016/j.chemosphere.2008.11.022.
Lithner, D. et al. (2011). Environmental and health hazard ranking and assessment of plastic polymers based on chemical composition. Science of the Total Environment, vol. 409, Issue 18, 2011, pp. 3309-3324, ISSN 0048-9697, https://doi.org/10.1016/j.scitotenv.2011.04.038.
PCT International Search Report for International Application No. PCT/IL2021/051360, mailed Apr. 4, 2022, 4pp.

(56) References Cited

OTHER PUBLICATIONS

PCT Written Opinion for International Application No. PCT/IL2021/051360, mailed Apr. 4, 2022, 6pp.

* cited by examiner

SYSTEM AND METHOD FOR REMOVING MICROPARTICLES AND NANOPARTICLES FROM WATER USING GELATINOUS ZOOPLANKTON MUCUS

CROSS REFERENCE TO RELATED APPLICATIONS

This application is a National Phase of PCT Patent Application No. PCT/IL2021/051,360 having International filing date of Nov. 16, 2021, which claims priority to U.S. Provisional Patent Application No. 63/114,808, filed Nov. 17, 2020, the contents of which is are all incorporated herein by reference in their entirety.

FIELD

The present subject matter relates to the removal of microparticles and nanoparticles from water. More particularly, the present subject matter relates to the removal of microparticle and nanoparticles from water using gelatinous zooplankton mucus.

BACKGROUND

Widespread production and application of natural and engineered microparticles and nanoparticles is increasing rapidly in a variety of different areas including electronics, biomedicine, pharma, cosmetics, energy, environment, catalyst supports, sensors, imaging agents in gene therapy, vehicles for targeted drug delivery, hydrogen storage devices, and other applications. This increase in the production and use of nanoparticles makes their presence in the natural environment more prevalent and potentially problematic [Nowack, B. and T. D. Bucheli (2007). "Occurrence, behavior and effects of nanoparticles in the environment." Environmental Pollution 150(1): 5-22, the entire contents of which is incorporated herein by reference].

Microplastics are defined as small pieces of plastic in the environment and are described by several size classifications, where the most accepted definition for microplastics is that they are less than 5 mm in size. Some definitions place a lower boundary of 1 µm, with particles smaller than this being classified as nanoplastics [Cole, M., P. Lindeque, C. Halsband and T. S. Galloway (2011). "Microplastics as contaminants in the marine environment: A review." Marine Pollution Bulletin 62(12): 2588-2597; Hollman, P. C. H., H. Bouwmeester and R. J. B. Peters (2013). Microplastics in aquatic food chain: Sources, measurement, occurrence and potential health risks. Wageningen, Rikilt-Institute of Food Safety: 1-27, the entire contents of which is incorporated herein by reference]. A further refinement has been proposed with regard to the definition of plastic particles, with three classes, mesoplastic (1 mm-2.5 cm), MP (1-1000 µm) and nanoplastics (<1 µm) [Frias, J. P. G. L. and R. Nash (2019). "Microplastics: Finding a consensus on the definition." Marine Pollution Bulletin 138: 145-147; Hartmann, N. B., T. Hüffer, R. C. Thompson, M. Hasselöv, A. Verschoor, A. E. Daugaard, S. Rist, T. Karlsson, N. Brennholt, M. Cole, M. P. Herrling, M. C. Hess, N. P. Ivleva, A. L. Lusher and M. Wagner (2019). "Are We Speaking the Same Language? Recommendations for a Definition and Categorization Framework for Plastic Debris." Environmental Science & Technology 53: 1039-1047, the entire contents of which is incorporated herein by reference]. However, more recently Nguyen et al. (2019) proposed a size of <100 nm as the size of nanoplastics [Nguyen, B., D. Claveau-Mallet, L. M. Hernandez, E. G. Xu, J. M. Farner and N. Tufenkji (2019). "Separation and Analysis of Microplastics and Nanoplastics in Complex Environmental Samples." Accounts of Chemical Research 52(4): 858-866, the entire contents of which is incorporated herein by reference]. Nguyen et al. (2019) followed the definition of Auffan et al. (2009) which is generally used in environmental nanotechnology [Auffan et al. (2009) Nature Nanotechnology, 4, 634-641, the entire contents of which is incorporated herein by reference]. This size classification between 1 mm to 5 mm and from 1 mm and 100 nm are defined as MPs and NPs, respectively [Nowack, B. and T. D. Bucheli (2007). "Occurrence, behavior and effects of nanoparticles in the environment." Environmental Pollution 150(1): 5-22, the entire contents of which is incorporated herein by reference].

In regards to microplastics and nanoplastics, polymeric resins typically contain additives that improve their performance, where some of these additives (i.e., phthalates, bisphenol-A) can highly affect animals, plants and humans if released from the plastics and absorbed by the biota [Thompson et al., 2009, Teuten et al., 2009, Lithner et al., 2009, 2011, the entire contents of which is incorporated herein by reference]. In addition, microplastic polymers behave like passive samplers that may accumulate organic pollutants present in wastewaters [Thompson et al., 2009; Cole, M., P. Lindeque, C. Halsband and T. S. Galloway (2011). "Microplastics as contaminants in the marine environment: A review." Marine Pollution Bulletin 62(12): 2588-2597, the entire contents of which is incorporated herein by reference].

The majority of these mainly hydrophobic compounds are persistent, bio-accumulative and toxic; thus they are of particular concern for human and environmental health [Engler, 2012, the entire contents of which is incorporated herein by reference], and regulated accordingly under the European chemicals legislation, REACH. However, NPs (compared with MPs) have higher bioavailability to marine organism as well as high potential to accumulate in the food web with potential damage to human health [Chae, Y. and Y.-J. An (2017). "Effects of micro- and nanoplastics on aquatic ecosystems: Current research trends and perspectives." Marine Pollution Bulletin 124(2): 624-632, the entire contents of which is incorporated herein by reference], such as damage to human brain tissue [Shen, M., Y. Zhu, Y. Zhang, G. Zeng, X. Wen, H. Yi, S. Ye, X. Ren and B. Song (2019). "Micro(nano)plastics: Unignorable vectors for organisms." Marine Pollution Bulletin 139: 328-331, the entire contents of which is incorporated herein by reference].

Wastewater treatment plants concentrate huge amounts of MPs from urban areas [Kay, P., R. Hiscoe, I. Moberley, L. Bajic and N. McKenna (2018). "Wastewater treatment plants as a source of microplastics in river catchments." Environmental science and pollution research international 25(20): 20264-20267, the entire contents of which is incorporated herein by reference]. These facilities serve as an entry point for a wide variety of MPs, but the fate of the particles depends on whether they remain in the treated effluent. Although wastewater treatment does not target MPs specifically, most of the MPs in wastewater treatment plants are removed by the treatment units (mainly in the primary settling and skimming processes) and retained in the sewage sludge [Carr, S. A., J. Liu and A. G. Tesoro (2016). "Transport and fate of microplastic particles in wastewater treatment plants." Water Research 91: 174-182, the entire contents of which is incorporated herein by reference]. However, a significant fraction may also occur in treated wastewater and be emitted to surface waters [Kay, P., R.

Hiscoe, I. Moberley, L. Bajic and N. McKenna (2018). "Wastewater treatment plants as a source of microplastics in river catchments." Environmental science and pollution research international 25(20):20264-20267, the entire contents of which is incorporated herein by reference]. Kay et al., 2018 showed that wastewater treatment plants can be a substantial point source of microplastics to freshwaters.

Microplastics and NPs are mainly of interest when considering wastewater treatment plant emissions as large fragments (>5 mm) are mostly removed from the wastewater during the first step of the treatment [Raju et al., 2018, the entire contents of which is incorporated herein by reference]. However, information on the smallest fraction of plastic particles (smaller than 100 μm) in water bodies (i.e. water system, wastewater treatment plant) is relatively scarce and still unknown [Nguyen, B., D. Claveau-Mallet, L. M. Hernandez, E. G. Xu, J. M. Farner and N. Tufenkji (2019). "Separation and Analysis of Microplastics and Nanoplastics in Complex Environmental Samples." Accounts of Chemical Research 52(4): 858-866, the entire contents of which is incorporated herein by reference].

A typical wastewater treatment plant first employs screens and grit chambers to remove larger and denser material, followed by primary settling tanks to remove slower to settle material. The water that leaves these processes is largely particle-free and fed to a biological treatment stage where high densities of microorganisms, known as activated sludge, biodegrade the carbon and nutrients in the water. Wastewater treatment plants may use tertiary treatment measures to raise the quality of the water to domestic and industrial standards, or to meet specific requirements for the safe discharge of water by reducing common biodegradable contaminants to safe levels. Tertiary treatment may also involve removal of pathogens, which ensures that water is safe for reuse purposes. Processes utilized include sand filtration and disinfection (UV light or chlorination).

Although the tertiary step (i.e, sand, antracid, membrane filtration) in wastewater treatment systems removes most particles >500 μm, a large proportion of MPs are smaller than 500 μm [Duis, K. and A. Coors (2016). "Microplastics in the aquatic and terrestrial environment: sources (with a specific focus on personal care products), fate and effects." Environmental sciences Europe 28(1): 2-2; Ben-David, E. A., M. Habibi, E. Haddad, M. Hasanin, D. L. Angel, A. M. Booth and I. Sabbah (2021). "Microplastic distributions in a domestic wastewater treatment plant: Removal efficiency, seasonal variation and influence of sampling technique." Science of The Total Environment 752: 141880, the entire contents of which is incorporated herein by reference]. Whereas there is an exponential increase in particle number with decreasing particle size [Enders et al., 2015, the entire contents of which is incorporated herein by reference], where they observed highest numbers in the range of 10-20 μm. Many household products (e.g. tooth paste) contain MP beads smaller than 10 [Verschoor, A. J., de Porter, L., Roex, E. (2014): Quick Scan and Prioritization of Microplastic Sources and Emissions, RIVM Advisory Letter, the entire contents of which is incorporated herein by reference], and smaller particles and fibers (nano-scale size) that are likely to pass through all treatment systems and end up in the final effluent. Since the present of MPs and NPs in water bodies is considered as emerging environmental and health threat [Peiponen, K.-E., J. Räty, U. Ishaq, S. Pélisset and R. Ali (2019). "Outlook on optical identification of micro- and nanoplastics in aquatic environments." Chemosphere 214: 424-429, the entire contents of which is incorporated herein by reference], there is a crucial need for more efficient and responsible removal processes of MPs and more importantly of NPs from water and wastewater bodies.

In comparison to NPs, MPs are difficult to separate, and to detect and quantify, by conventional filtration systems [Nowack, B. and T. D. Bucheli (2007). "Occurrence, behavior and effects of nanoparticles in the environment." Environmental Pollution 150(1): 5-22; Shen, M., Y. Zhang, Y. Zhu, B. Song, G. Zeng, D. Hu, X. Wen and X. Ren (2019). "Recent advances in toxicological research of nanoplastics in the environment: A review." *Environmental Pollution* 252: 511-521, the entire contents of which is incorporated herein by reference]. In recent research, flocculation and coagulation processes have been applied to remove MPs and NPs from water [Chen, Z., J. Liu, C. Chen and Z. Huang (2020). "Sedimentation of nanoplastics from water with Ca/Al dual flocculants: Characterization, interface reaction, effects of pH and ion ratios." Chemosphere 252: 126450, the entire contents of which is incorporated herein by reference]. Precipitation-flocculation with inorganic flocculants [i.e., alum ($Al_2$—($SO_4$)$_3$,$18H_2O$), ferric chloride, and polyaluminum chloride (PAC)] and separation of the flocs by sedimentation, is a commonly used process in water treatment. This flocculation-based technique for destabilizing stable suspensions and achieving solid-water separation has been well established in water treatment [Amirtharajah, A.; O'Melia, C. R. (1999) In Water Quality and Treatment-A Handbook of Community Water Supplies, 5th ed.; Letterman, R. D., Ed.; American Water Works Association, the entire contents of which is incorporated herein by reference).

More recently, natural-based flocculants have been used in the treatment of industrial wastewater and textile wastewater [Ajao, V., H. Bruning, H. Rijnaarts and H. Temmink (2018). "Natural flocculants from fresh and saline wastewater: Comparative properties and flocculation performances." Chemical Engineering Journal 349: 622-632; Dotto, J., M. R. Fagundes-Klen, M. T. Veit, S. M. Palacio and R. Bergamasco (2019). "Performance of different coagulants in the coagulation/flocculation process of textile wastewater." Journal of Cleaner Production 208: 656-665, the entire contents of which is incorporated herein by reference].

SUMMARY

Unless otherwise defined, all technical and scientific terms used herein have the same meaning as commonly understood by one of ordinary skill in the art to which this subject matter belongs. Although methods and materials similar or equivalent to those described herein can be used in the practice or testing of the present subject matter, suitable methods and materials are described below. In case of conflict, the patent specification, including definitions, will control. In addition, the materials, methods, and examples are illustrative only and not intended to be limiting.

According to one aspect of the present subject matter, there is provided a system for removing particles from water, the system comprising:
  a reactor configured to allow interaction of gelatinous zooplankton mucus with particles in water comprising particles and as a result further allowing generation of particle aggregates in the water;
  a water input fluidically connected to the reactor, and configured to supply water comprising particles to the reactor;
  a mucus input fluidically connected to the reactor, and configured to supply gelatinous zooplankton mucus to the water comprising particles in the reactor;

a water pipe fluidically connected to the reactor, and configured to allow exit of water comprising particle aggregates from the reactor;

a filter fluidically connected to the water pipe, and configured to receive water comprising particle aggregates from the water pipe and further filter the water; and a filtered water pipe fluidically connected to the filter, and configured to allow exit of filtered water from the filter.

According to one embodiment, the reactor further comprising a mixing element configured to mix the water comprising particles and the gelatinous zooplankton mucus.

According to another embodiment, the filter comprising a filtering element configured to allow passage of filtered water through the filtering element, while eliminating passage of particle aggregates through the filtering element.

According to yet another embodiment, the particles are microparticles.

According to still another embodiment, the particles are nanoparticles.

According to a further embodiment, the particles are and nanoplastics.

According to yet a further embodiment, the particles are selected from the group consisting of: microparticles, nanoparticles, nanoplastics, and any combination thereof.

According to an additional embodiment, the water comprising particles 60 is treated wastewater comprising particles.

According to an additional embodiment, the gelatinous zooplankton mucus is extracted from a gelatinous zooplankton, wherein the gelatinous zooplankton is selected from the group consisting of: tunicates, comb jellies, jellyfish and any combination thereof.

According to yet an additional embodiment, the gelatinous zooplankton mucus is extracted from a gelatinous zooplankton, wherein the gelatinous zooplankton is selected from the group consisting of: jellyfish *Aurelia* sp. (A.a.), *Rhopilema nomadica* (R.n.), and a combination thereof.

According to another embodiment, the gelatinous zooplankton mucus is extracted from at least one species of gelatinous zooplankton.

According to a further embodiment, at least one coagulating-flocculating agent is provided to the water comprising particles in the reactor, in order to allow formation of particle aggregates in the water in the reactor by allowing interaction between the particles in the water and the gelatinous zooplankton mucus and the at least one coagulating-flocculating agent.

According to yet a further embodiment, the coagulating-flocculating agent is polyaluminum chloride (PAC).

According to still a further embodiment, the coagulating-flocculating agent is ferric chloride.

According to an additional embodiment, the coagulating-flocculating agent is selected from the group consisting of: PAC, ferric chloride, and a combination thereof.

According to another aspect of the present subject matter, there is provided a method for removing particles from water, the method comprising:

providing a reactor configured to allow interaction of gelatinous zooplankton mucus with particles in water comprising particles and as a result further allowing generation of particle aggregates in the water;

supplying water comprising particles to the reactor through a water input fluidically connected to the reactor, and configured to supply water comprising particles to the reactor;

supplying gelatinous zooplankton mucus to the reactor through a mucus input fluidically connected to the reactor, and configured to supply gelatinous zooplankton mucus to the water comprising particles in the reactor;

allowing formation of particle aggregates in the water in the reactor by allowing interaction between the particles in the water and the gelatinous zooplankton mucus;

exiting water comprising particle aggregates from the reactor through a water pipe fluidically connected to the reactor, and configured to allow exit of water comprising particle aggregates from the reactor;

removing the particle aggregates from the water by passing the water comprising particle aggregates through a filter fluidically connected to the water pipe, and configured to receive water comprising particle aggregates from the water pipe and further filter the water; and exiting filtered water from the filter through a filtered water pipe fluidically connected to the filter, and configured to allow exit of filtered water from the filter.

According to one embodiment, the particles are microparticles.

According to another embodiment, the particles are nanoparticles.

According to yet another embodiment, the particles are and nanoplastics.

According to still another embodiment, the particles are selected from the group consisting of: microparticles, nanoparticles, nanoplastics, and any combination thereof.

According to a further embodiment, the water comprising particles is treated wastewater comprising particles.

According to an additional embodiment, the gelatinous zooplankton mucus is extracted from a gelatinous zooplankton, wherein the gelatinous zooplankton is selected from the group consisting of: tunicates, comb jellies, jellyfish and any combination thereof.

According to yet an additional embodiment, the gelatinous zooplankton mucus is extracted from a gelatinous zooplankton, wherein the gelatinous zooplankton is selected from the group consisting of: jellyfish *Aurelia* sp. (A.a.), *Rhopilema nomadica* (R.n.), and a combination thereof.

According to another embodiment, the gelatinous zooplankton mucus is extracted from at least one species of gelatinous zooplankton.

According to one embodiment, the method further comprising providing at least one coagulating-flocculating agent to water comprising particles in the reactor, and allowing formation of particle aggregates in the water in the reactor by allowing interaction between the particles in the water and the gelatinous zooplankton mucus and the at least one coagulating-flocculating agent.

According to another embodiment, the coagulating-flocculating agent is polyaluminum chloride (PAC).

According to yet another embodiment, the coagulating-flocculating agent is ferric chloride.

According to still another embodiment, the coagulating-flocculating agent is selected from the group consisting of: PAC, ferric chloride, and a combination thereof.

BRIEF DESCRIPTION OF THE DRAWINGS

Embodiments are herein described, by way of example only, with reference to the accompanying drawings. With specific reference now to the drawings in detail, it is stressed that the particulars shown are by way of example and for purposes of illustrative discussion of the preferred embodiments, and are presented in the cause of providing what is believed to be the most useful and readily understood description of the principles and conceptual aspects of the embodiments. In this regard, no attempt is made to show structural details in more detail than is necessary for a fundamental understanding, the description taken with the drawings making apparent to those skilled in the art how several forms may be embodied in practice.

In the Drawings.

DESCRIPTION OF THE PREFERRED EMBODIMENTS

Figure 1:
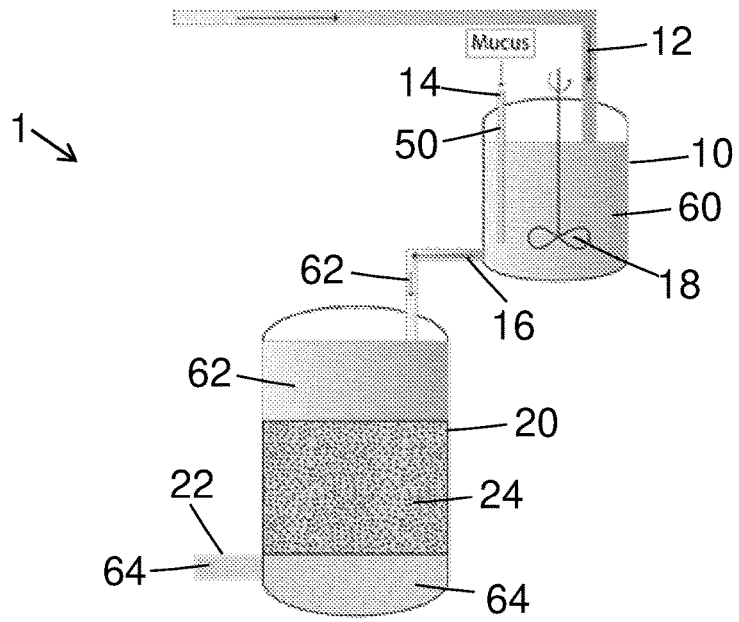
FIG. 1 schematically illustrates, according to an exemplary embodiment, a system for removing particles from water.

Before explaining at least one embodiment in detail, it is to be understood that the subject matter is not limited in its application to the details of construction and the arrangement of the components set forth in the following description or illustrated in the drawings. The subject matter is capable of other embodiments or of being practiced or carried out in various ways. Also, it is to be understood that the phraseology and terminology employed herein is for the purpose of description and should not be regarded as limiting. In discussion of the various figures described herein below, like numbers refer to like parts. The drawings are generally not to scale.

For clarity, non-essential elements were omitted from some of the drawings.

The term "double distilled water" is occasionally referred to hereinafter "DDW".

The term "particles" is occasionally used to describe microparticles or nanoparticles.

In water treatment, particles are removed from the water in a process termed coagulation-flocculation. Coagulation-flocculation involves addition of materials that promote clumping of the particles into larger flocs that are easily separated from the water. Coagulation is a chemical process that involves neutralization of the charge of the particles, whereas flocculation is a physical process that does not involve neutralization of the charge of the particles. Materials that promote coagulation-flocculation of particles in water are termed hereinafter "coagulating-flocculating agents".

The term "polystyrene" is occasionally referred to hereinafter as "PS".

The term "polymethyl methacrylate" is occasionally referred to hereinafter as "PMMA".

Nanoplastic particles having hydrophobic properties are occasionally referred to hereinafter as "EN5".

Nanoplastic particles having hydrophilic properties are occasionally referred to hereinafter as "EN7".

The term "jellyfish" is occasionally referred to hereinafter as "JF".

The term "*Aurelia* sp." is occasionally referred to hereinafter as "A.a."

The term "*Rhopilema nomadica*" is occasionally referred to hereinafter as "R.n.".

The term "ferric chloride" is occasionally referred to hereinafter as "$FeCl_3$".

The term "aluminium chlorohydrate [$Al_2Cl(OH)_5$]", or "aluminium chlorohydrate", or polyaluminum chloride is occasionally referred to hereinafter as "PAC".

The term "aluminium sulphate hydrate 98% [$Al_2(SO_4)_3 \cdot 18H_2O$]", or "aluminium sulphate hydrate 98%", is occasionally referred to hereinafter as "Alum".

The present subject matter provides a system and method for removing microparticles, nanoparticles and nanoplastics from water. For the sake of simplicity, microparticles, nanoparticles and nanoplastics are occasionally referred to hereinafter as "particles". The system and method for removing particles from water are based on using gelatinous zooplankton mucus. Gelatinous zooplankton mucus is a natural-based matrix that does not pose environmental threats, nor health issues for humans and animals consuming the treated water.

Any gelatinous zooplankton organism is under the scope of the present subject matter. Some exemplary gelatinous zooplankton organisms include, but not limited to, tunicates, comb jelly, jellyfish, and the like. More particularly, any species of jellyfish is under the scope of the present subject matter, for example, *Aurelia* sp. (A.a.), *Rhopilema nomadica* (R.n.) and the like.

Referring now to FIG. 1, schematically illustrating, according to an exemplary embodiment, a system for removing particles from water. According to one embodiment, the system 1 for removing particles from water comprises:

a reactor 10 configured to allow interaction of gelatinous zooplankton mucus 50 with particles in water comprising particles 60 and as a result further allowing generation of particle aggregates in the water;

a water input 12 fluidically connected to the reactor 10, and configured to supply water comprising particles 60 to the reactor 10;

a mucus input 14 fluidically connected to the reactor 10, and configured to supply gelatinous zooplankton mucus 50 to the water comprising particles 60 in the reactor 10;

a water pipe 16 fluidically connected to the reactor 10, and configured to allow exit of water comprising particle aggregates 62 from the reactor 10;

a filter 20 fluidically connected to the water pipe 16, and configured to receive water comprising particle aggregates 62 from the water pipe 16 and further filter the water; and a filtered water pipe 22 fluidically connected to the filter 20, and configured to allow exit of filtered water 64 from the filter 20.

According to one embodiment, the reactor 10 further comprises a mixing element 18 configured to mix the water comprising particles 60 and the gelatinous zooplankton mucus 50.

According to one embodiment, the filter 20 comprises a filtering element 24 configured to allow passage of filtered water 64 through the filtering element 24, while eliminating passage of particle aggregates through the filtering element. Any type of filtering element 24 is under the scope of the present subject matter, for example gravel, anthracite, sand, any type of membrane suitable to allow passage of filtered water 64 while eliminating passage of particle aggregates, for example UF membrane, MF membrane, NF membrane, and the like.

Figure 2:
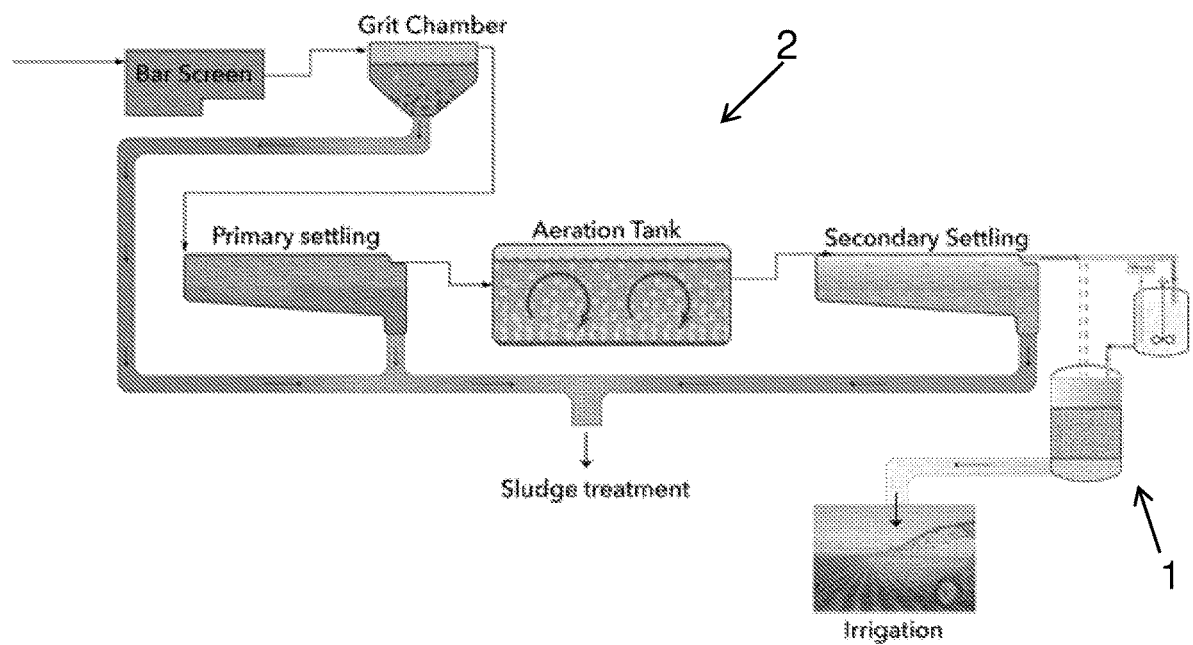
FIG. 2, schematically illustrates, according to an exemplary embodiment, a system for treating wastewater combined with a system for removing particles from water.

Referring now to FIG. 2, schematically illustrating, according to an exemplary embodiment, a system for treating wastewater combined with a system for removing particles from water, that is based on using gelatinous zooplankton mucus. The system 2 for treating wastewater comprises prior art components used to treat wastewater. However, treated wastewater obtained from prior art systems for treating wastewater can comprise particles that can harm consumers of the treated wastewater. Therefore, according to one embodiment, the system 1 for removing particles from water, that is illustrated in FIG. 1, is combined with the system 2 for treating wastewater, as illustrated in FIG. 2, in order to remove particles from the treated wastewater.

As illustrated in FIG. 2, treated wastewater that exits the last stage of the system for treating wastewater, for example the secondary settling, is fed into the system 1 for removing particles from water, in order to remove the particles from the treated wastewater.

According to one embodiment, at least one coagulating-flocculating agent is provided to the water comprising particles 60 in the reactor 10, in order to allow formation of particle aggregates in the water in the reactor 10 by allowing interaction between the particles 60 in the water and the gelatinous zooplankton mucus 50 and the at least one coagulating-flocculating agent.

The present subject matter further provides a method for removing particles from water, the method comprising:

providing a reactor 10 configured to allow interaction of gelatinous zooplankton mucus 50 with particles in water comprising particles 60 and as a result further allowing generation of particle aggregates in the water;

supplying water comprising particles 60 to the reactor 10 through a water input 12 fluidically connected to the reactor 10, and configured to supply water comprising particles 60 to the reactor 10;

supplying gelatinous zooplankton mucus 50 to the reactor 10 through a mucus input 14 fluidically connected to the reactor 10, and configured to supply gelatinous zooplankton mucus 50 to the water comprising particles 60 in the reactor 10;

allowing formation of particle aggregates in the water in the reactor 10 by allowing interaction between the particles 60 in the water and the gelatinous zooplankton mucus 50;

exiting water comprising particle aggregates 62 from the reactor 10 through a water pipe 16 fluidically connected to the reactor 10, and configured to allow exit of water comprising particle aggregates 62 from the reactor 10;

removing the particle aggregates from the water by passing the water comprising particle aggregates 62 through a filter 20 fluidically connected to the water pipe 16, and configured to receive water comprising particle aggregates 62 from the water pipe 16 and further filter the water; and exiting filtered water 64 from the filter 20 through a filtered water pipe 22 fluidically connected to the filter 20, and configured to allow exit of filtered water 64 from the filter 20.

According to one embodiment, the particles are microparticles.

According to another embodiment, the particles are nanoparticles.

According to yet another embodiment, the particles are and nanoplastics.

According to still another embodiment, the particles are selected from the group consisting of: microparticles, nanoparticles, nanoplastics, and any combination thereof.

According to one embodiment, the water comprising particles 60 is treated wastewater comprising particles.

According to an additional embodiment, the gelatinous zooplankton mucus is extracted from a gelatinous zooplankton, wherein the gelatinous zooplankton is selected from the group consisting of: tunticates, comb jellies, jellyfish and any combination thereof.

According to yet an additional embodiment, the gelatinous zooplankton mucus is extracted from a gelatinous zooplankton, wherein the gelatinous zooplankton is selected from the group consisting of: jellyfish *Aurelia* sp. (A.a.), *Rhopilema nomadica* (R.n.), and a combination thereof.

According to another embodiment, the gelatinous zooplankton mucus is extracted from at least one species of gelatinous zooplankton.

According to one embodiment, the method further comprises providing at least one coagulating-flocculating agent to water comprising particles 60 in the reactor 10, and allowing formation of particle aggregates in the water in the reactor 10 by allowing interaction between the particles 60 in the water and the gelatinous zooplankton mucus 50 and the at least one coagulating-flocculating agent.

According to one embodiment, the coagulating-flocculating agent is polyaluminum chloride (PAC).

According to another embodiment, the coagulating-flocculating agent is ferric chloride.

According to yet another embodiment, the coagulating-flocculating agent is selected from the group consisting of: PAC, ferric chloride, and a combination thereof.

Embodiments of the present subject matter are further illustrated in the examples given hereinafter.

EXAMPLES

Materials and Methods

Nanoplastic Particles

Two types of nanoplastic particles were used: Polystyrene latex beads that were purchased from Sigma-Aldrich Israel Ltd, having a particle size of substantially 100 nm; and Polymethyl methacrylate nanoparticles, having a particle size of substantially 100 nm, that were synthesized and provided by Dr. Andy Booth (SINTEF Ocean, Trondheim, Norway). Each type of nanoplastic particle is divided to two sorts: EN5 having hydrophobic properties, and EN7 having hydrophilic properties. A calibration curve was prepared for each type of nanoplastic particles as described in "calibration curve of particles" hereinafter. Samples used in experiments were diluted by Double Distilled Water (DDW) and substantially 2 mM $CaCl_2$ to obtain the following final concentrations: substantially 2% PS-EN5, substantially 2% PS-EN7, substantially 3% PMMA-EN5, and substantially 3% PMMA-EN7.

Jellyfish

In the experiments described herein two species of jellyfish were used as exemplary gelatinous zooplankton. It should be noted, though, that these organisms are only exemplary. Any other gelatinous zooplankton organism could be used in these experiments, and is under the scope of the present subject matter. The two jellyfish species that were used in the experiments are: *Aurelia* sp. (occasionally designated A.a.) and *Rhopilema nomadica* (occasionally designated R.n.). The jellyfish were collected near Mikhmoret, Israel, in the Eastern Mediterranean Sea (32°24'23"N 34°52'24"E). When jellyfish were scarce at sea, *Aurelia* sp. Jellyfish were obtained from a display in aquaria at the Biblical Zoo in Jerusalem.

Collection of Jellyfish

The collection of jellyfish at sea, using a motorboat took place in the morning hours at a distance of substantially 0.5-1.5 nautical miles west of Mikhmoret, Israel, where the seafloor depth was in the range of substantially 12 to 35 m. Each jellyfish was captured separately and brought onboard the boat using a 60 cm dip net and a bucket to minimize stress and physical damage. On the boat, the jellyfish were kept in separate 20 L plastic buckets filled with ambient seawater in the shade, until reaching the laboratory. Upon reaching the laboratory, substantially one hour after collection, each jellyfish was taken out of the bucket to record bell size (distance between opposite rhopalia when the jellyfish is placed with oral side facing up) and wet weight.

Extraction of Jellyfish Mucus

Mucus was extracted from the collected jellyfish. Each jellyfish was held in the air to let water drip off the body for a few seconds. Then the mucus was extracted by placing the jellyfish in a funnel above a container and letting the mucus drip into the container. After recording the volume of mucus collected from each jellyfish, mucus from a batch of several individuals was pooled and mixed thoroughly and then divided into two samples. One sample was filtered through a 100 μm filtration system (marked F) into a container, and the other sample was gently sieved through a 300 μm sieve (marked N) into a separate container. Mucus was then aliquoted into sterile 1.5 ml Eppendorf tubes or 15 ml tubes, frozen and stored at substantially −20° C. until use.

Coral

Soft corals of the genus *Sarcophyton* were used for the extraction of coral mucus.

Extraction of Coral Mucus

The coral dome of *Sarcophyton* coral was cut, and the remaining coral was kept in seawater at 4° C. for two days. During this period a large amount of mucus was formed on the surface of the coral. The coral mucus was collected and stored in test tubes at −20° C.

Alga

An alga of the species *Porphyridium cruentum* was used for the extraction of algal mucus.

Extraction of Algal Mucus

While growing *Porphyridium cruentum* excrete mucus, comprising polysaccharides, to the surrounding water. The algal mucus was extracted from the growth medium, and undergone ultrafiltration to separate the algal mucus from the aqueous suspension. Then, the algal mucus was desalted and concentrated.

Coagulating-Flocculating Agents

The following coagulating-flocculating agents were used in the experiments: ferric chloride, aluminium chlorohydrate $[Al_2Cl(OH)_5]$, and aluminium sulphate hydrate 98% $[Al_2(SO_4)_3 \cdot 18H_2O]$. The coagulating-flocculating agents were purchased from Merck Schuchardt OHG (Germany), and AVOCADO research chemicals Ltd (UK). Stock solutions of substantially 750 mg/L, 375 mg/L and 75 mg/L in DDW of each coagulating-flocculating agent were prepared. The pH and electric conductivity of each solution was determined.

Real Wastewater

Tertiary effluent were obtained from a wastewater treatment plant in Karmiel (Israel). A 100 ml sample of the tertiary effluent was filtered with a 0.45 μm filter, and the filtrate was filtered again with a 0.22 μm filter, to remove organic and synthetic substances. The filtrate was used in the experiments as real wastewater. The pH of the real wastewater was 7.67, and the electric conductivity of the real wastewater was between 1352-1590 μS.

Synthetic Wastewater

A solution of 2 mM calcium chloride ($CaCl_2$) (Sigma-Aldrich Israel Ltd.) was prepared using distilled water and was used as a synthetic wastewater solution. The 2 mM $CaCl_2$ solution had an electric conductivity similar to that of the real wastewater, and pH value (6-7) of the synthetic wastewater solution are similar to the pH value of the real wastewater.

Seawater

Seawater samples were collected from the Mediterranean Sea, filtered with a 0.45 μm filter, and the filtrate was filtered again with a 0.22 μm filter.

Coagulation-Flocculation with Coagulating-Flocculating Agents

Coagulation-flocculation experiments were carried out in 1.5 ml glass vials in triplicates for each concentration of each coagulating-flocculating agent—ferric chloride, aluminium chlorohydrate, or aluminium sulphate hydrate 98%, with every type of microparticles and nanoparticles. Nine 1.5 ml glass vials for each coagulating-flocculating agent were each filled in with 1.355 ml DDW and substantially 30 μl, or substantially 45 μl, polystyrene or polymethyl methacrylate, sort EN5 or EN7, from the stock solutions that were previously described. After vortexing the vials for obtaining a homogeneous solution, substantially 100 μl from each concentration of the stock solutions (substantially 750, 375 and 75 mg/L) of each coagulating-flocculating agent was added to the nine vials reaching a final volume of substantially 1.5 ml and a final concentration of either substantially 50, 25, or 5 mg/L for each coagulating-flocculating agent. After vortexing the vials for substantially 15-30 seconds, substantially 100 μl samples from each vial were transferred to separate well of a 96 wells plate at time zero for analysis in a microplate fluorometer with either excitation at substantially 485 nm and emission at substantially 460 nm for detection of polystyrene, sort EN5 or EN7; or excitation at substantially 550 nm and emission at substantially 590 nm or PMMA EN5/7, respectively. Every substantially 10 min, for a substantially 30 min period, substantially 1000 of the sample was taken for analysis in a microplate fluorometer.

Coagulation-Flocculation in Either Synthetic Wastewater or Real Wastewater

In experiments conducted with either synthetic wastewater or real wastewater, the DDW was replaced with either synthetic wastewater or real wastewater.

Coagulation-Flocculation with Mucus

In experiments conducted with mucus, the substantially 100 μl coagulating-flocculating agent solution was replaced with substantially 100 μl mucus. Mucus from *Rhopilema nomadica* (R.n.) and mucus from *Aurelia* sp. (A.a.) was used.

Coagulation-Flocculation with a Combination of Coagulating-Flocculating Agent and Mucus In experiments conducted with combinations of a coagulating-flocculating agent and mucus, substantially 150 μl of coagulating-flocculating agent solution and substantially 100 μl mucus were used, and the volume of either DDW, or synthetic wastewater, or real wastewater was adjusted accordingly to obtain a final volume of substantially 1.5 ml.

Negative Control Coagulation-Flocculation Experiments

In negative control experiments, the coagulating-flocculating agent solution and/or the mucus were omitted, and the volume of either DDW, or synthetic wastewater, or real wastewater, was adjusted accordingly to obtain a final volume of substantially 1.5 ml.

Rapid Sand Filtration Column

A rapid sand filtration column was used as a prototype of a filter column, for removing particles, particularly plastic particles, from water, wastewater and the like, according to embodiments of the present subject matter.

Sand collected at a wastewater treatment plant (Karmiel, Israel) was treated by calcining in a furnace (Thermolyne furnace 48000) at substantially 500° C. for substantially 1.5 h to ensure volatilization remaining organic matter. After cooling, the sand was rinsed multiple times in substantially 4 mM sulfuric acid and then washed for many times with distilled water. Substantially 20-22 g of the treated sand was added to each of the two glass columns C10/10 ((10 cm×10 mm) (GE Healthcare Bioscience). One column was connected to a lead fluid-BQ80S pump (El-hamma, Israel), and the second column was connected to a BT100M pump (o.fi. Electronics Ltd.). Both pumps provided a similar flow rate between substantially 13 to 16 ml/min, which is equivalent to the Darcy velocity of the real filtration system of the wastewater treatment plant (Karmiel, Israel).

Filtration with Mucus

A suspension of substantially 50 ml 1% nanoparticles, and 4 ml mucus, was used in each run through the columns. Samples of substantially 100 μL of feed (suspension before filtration) and effluent (suspension after filtration) were transferred to a 96-wells plate and analyzed by a fluorescence plate reader with excitation at substantially 485 nm and emission at substantially 460 nm for PS EN5/7, or excitation at substantially 550 nm and emission at substantially 590 nm for PMMA EN5/7. The sand in the column was replaced after each run.

Filtration with Mucus and Coagulating-Flocculating Agent

Real wastewater, in a volume of substantially 32.9 ml, was mixed with substantially 400 μl plastic particles in a 100 ml glass beaker. Then, substantially 4 ml of coagulating-flocculating agent solution was added, and the suspension was mixed for substantially 30 sec using a magnetic stirrer at the highest speed. Then, substantially 2.7 ml of mucus was added and mixed at the same conditions. Then, the suspension was allowed to react for substantially 5 min before passing through the aforementioned filter columns. Samples of substantially 100 μL, of feed (suspension before filtration) and effluent (suspension after filtration) were transferred to a 96-wells plate and analyzed by a fluorescence plate reader with excitation at substantially 485 nm and emission at substantially 460 nm for PS EN5/7, or excitation at substantially 550 nm and emission at substantially 590 nm for PMMA EN5/7.

Determination of Particle Concentration

Microplate based fluorescence measurements were performed using a Fluoroskan Ascent microplate reader (Thermo Scientific), in translucent 96-well tissue culture plates (Jet Biofil). Measurements were conducted using an excitation and emission filter pair of 485 nm and 460 nm, respectively. Concentration of particles was determined by comparing the measured fluorescence values to a calibration curve of the particles that was prepared as described hereinafter.

Calibration Curve of Particles

A series of eight concentrations of particles in a range of substantially 0.5-10% (v/v) and additional five concentrations in the low range (0.1-2%) were prepared in 1.5 ml Eppendorf tubes. Particles included fluorescent PMMA and PS, respectively. Substantially 100 μl from each tube was transferred to a 96-well plate and read using a plate reader. Results were used to construct calibrations curves for PMMA and PS nanoparticles.

Nanoparticles Capture in Various Types of Water

Figure 3:
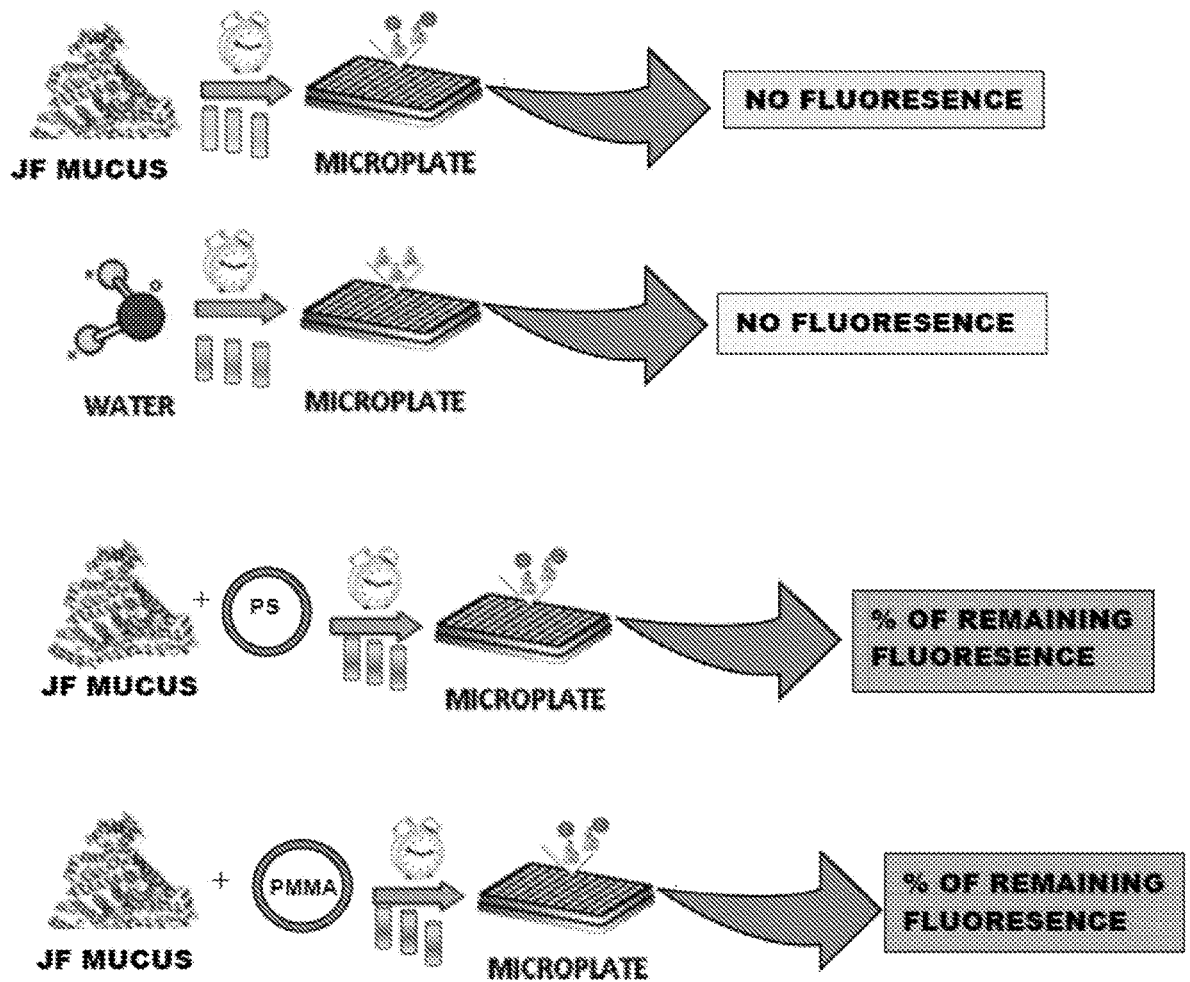
FIG. 3 schematically illustrates, according to an exemplary embodiment, a setup of a nanoparticle capture experiment in various types of water.

Referring now to FIG. 3, schematically illustrating, according to an exemplary embodiment, a setup of a nanoparticle capture experiment in DDW, seawater or real wastewater. Frozen JF mucus samples, stored in 1.5 ml Eppendorf tubes at substantially −20° C., were thawed at ambient temperature (substantially 25° C.) for substantially 15 min and then gently vortexed until the mucus was completely thawed. A diluted suspension of nanoparticles [substantially 1-3.2% (v/v)] in DDW, or seawater, or real wastewater, was prepared from a nanoparticle stock solution. Nanoparticle capture experiments were conducted in transparent 2 ml capped glass vials in triplicates. Substantially 1.4 ml of substantially 1-3.2% nanoparticle suspension was transferred to each of the triplicate vials and to a positive control vial. To a negative control vial, substantially 1.5 ml DDW was added. Substantially 100 μl of thawed mucus was then added to the triplicate vials to achieve a final volume of substantially 1.5 ml and a nanoparticle concentration of substantially 3% in each vial. The positive control vial was topped up with substantially 100 μl DDW. All vials were vortexed at top speed for substantially sec. Immediately after the vortexing, substantially 100 μl from the upper clear phase in each vial was taken for determination of particle concentration (T=0 min). Substantially 100 μl samples were then taken for determination of particle concentration every substantially 10 min in the first substantially 30 min and after substantially 60 min (T=10 min, T=20 min, T=30 min, T=60 min). The vials were also photographed at T=0 min, T=30 min and T=60 min.

Rapid Sand Filtration of Water with Nanoplastic Particles Treated with Jellyfish Mucus Rapid sand filtration (RSF) was emulated in a laboratory using 10 cm×10 mm glass column. Flow rate in a lab-scale column was maintained at 13-16 ml/min. This flow rate matches the hydraulic loading rate of the real system) using peristaltic pumps. Samples of DDW (40 ml) were spiked into the lab-scale system with palladium (PD) doped nanoplastic particles and thoroughly mixed (30 sec. at high speed) to produce dispersions with a final concentration of 40 μg/L. A subsample of 10 ml from each was then transferred into a 15 ml test-tube; hereafter referred to as the "IN" samples. Prior to feeding the column, a premeasured optimal dose of freshly thawed mucus was added to each of the spiked samples, and the samples were thoroughly mixed as above. Samples were pumped into the column and were collected from the column outlet and transferred into 15 ml test-tubes; hereafter referred to as the "OUT" samples. The "IN" and "OUT" samples were analyzed by Inductively coupled plasma mass spectrometry (ICP-MS) at Hi-Labs Laboratories, Rehovot. Israel.

ICP-MS Test Method Procedure (if Test was not Preformed According to the Method)
1. Sample Preparation:
    0.5 gr of sample was diluted with 3 ml of a 65% $HNO_3$ and up to 10 ml with ultra-pure water.
2. Calibration Curve Preparation:
    5 standards were produced which the highest point of the curve was 100 ppb and the lowest point of the curve was 0 ppb of the required elements.
    Blank solution was a 1% $HNO_3$ solution.

Results

Optimization of Jellyfish Mucus Dose for Removing Particles from Water

Figure 4A:
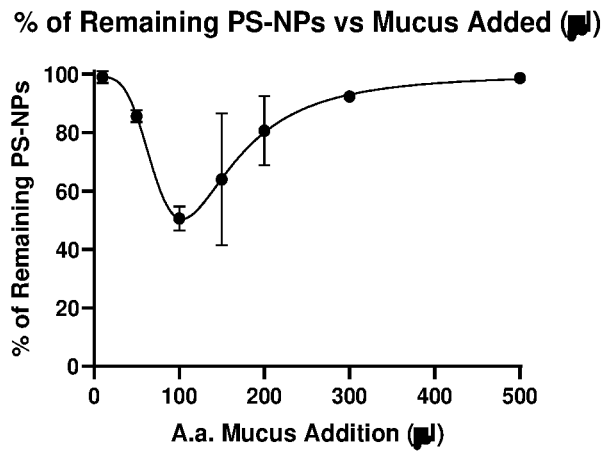
FIGS. 4A-C show results of an experiment for optimizing the dose of *Aurelia* sp. (A.a.) mucus for removing three type of particles—PS, EN5, and EN7, from water.
Figure 4B:
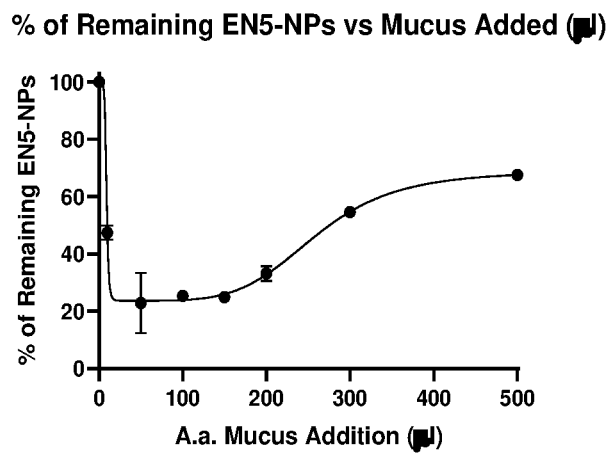
Figure 4C:
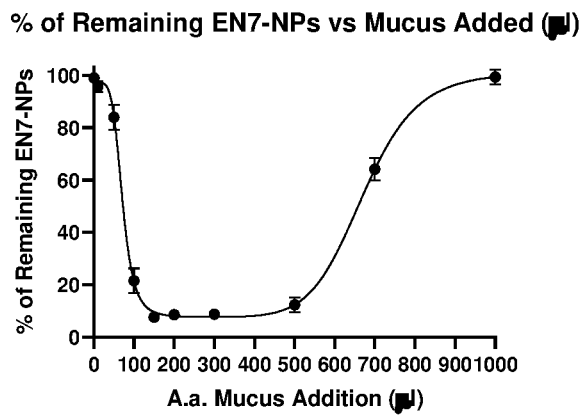

Referring now to FIGS. 4A-C showing results of an experiment for optimizing the dose of *Aurelia* sp. (A.a.) mucus for removing three type of particles—PS, EN5, and EN7, from water. The lowest dose concentration required to remove the highest percentage of particles from the liquid suspension was investigated using the following volumes of thawed A.a. mucus: substantially 10, 50, 100, 150, 200, 300 and 500 μl to top up PS-NPs suspensions in glass vials to a final volume of substantially 1.5 ml (v/v range: substantially 0.67-33.3%). Visual observation were supported by dose-response curve indicating that substantially 100 μl of A.a. mucus was the most efficient in capturing PS-NPs from the liquid suspension; achieving the best removal efficiency within 10 min.

Kinetics of Removal of Particles from Water with Jellyfish Mucus

Figure 5A:
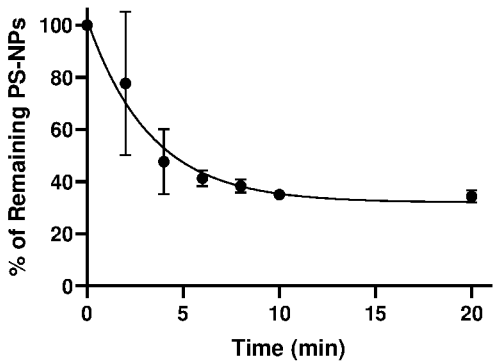
FIGS. 5A-C show results of an experiment for determining kinetics of removal of particles from water with jellyfish mucus.
Figure 5B:
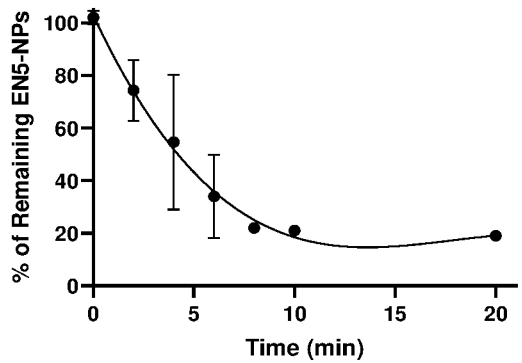
Figure 5C:
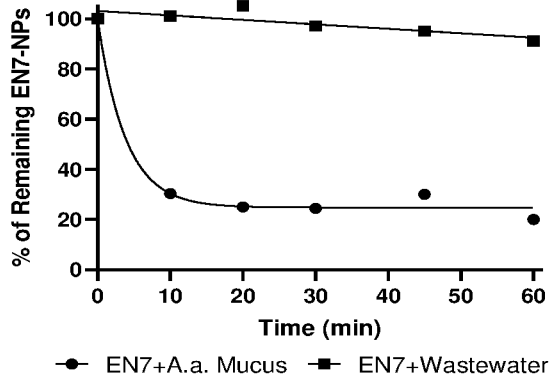

Referring now to FIGS. 5A-C showing results of an experiment for determining kinetics of removal of particles from water using jellyfish mucus. Percentage of removal of particles over time was tested using a time series comprising several time points: 0, 2, 4, 6, 8, 10 and 20 minutes, as shown in FIGS. 5A-B; and 0, 10, 20, 30, 45 and 60 minutes, as shown in FIG. 5C. Optimal removal of PS occurred at T=10 minutes and did not improve further over time. Measurement of particle removal immediately after T=0 minutes was complicated by the diffused aggregation that occurred prior to the formation and settling of the mucus-particle complexes, thus the high standard variation observed at t=2 and 4 minutes.

Figure 6A:
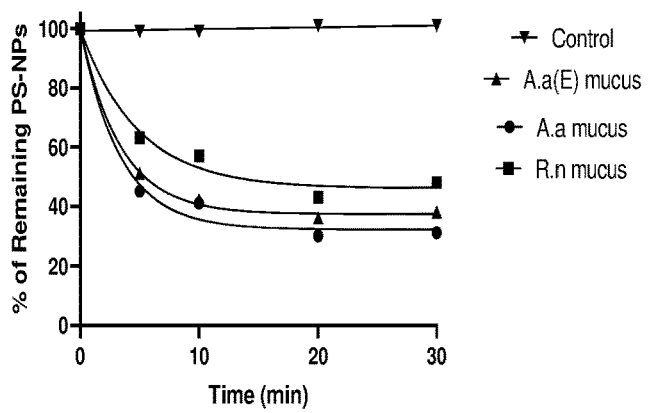
FIGS. 6A-C show removal efficiency of particles by jellyfish mucus from different jellyfish species and sources.
Figure 6B:
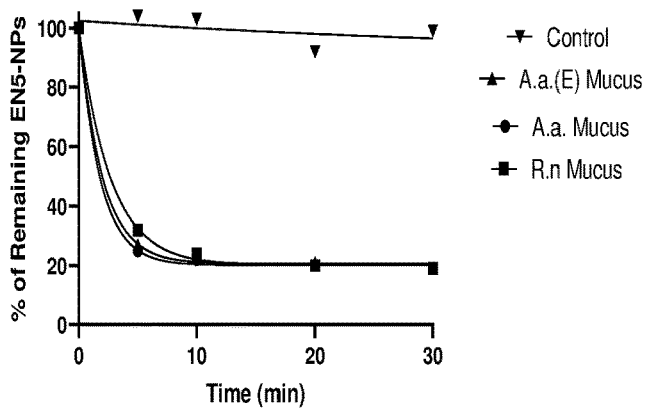
Figure 6C:
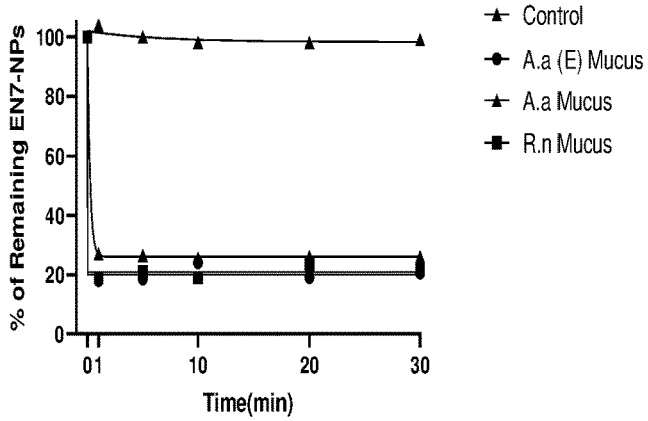

Capturing Efficiency of Particles by Jellyfish Mucus from Different Jellyfish Species and Sources Referring now to FIGS. 6A-C showing removal efficiency of particles by jellyfish mucus from different jellyfish species and sources. The capturing efficiency of freshly thawed JF mucus extracted from three different sources/species including A.a. imported from Hong Kong, and locally harvested A.a. and R.n. (Michmoret, Israel) were tested on aqueous suspensions of three different types of plastic particles (PS, PMMA EN-5 and EN-7). After mixing the mucus and the particle suspensions, subsamples were removed from just below the surface of the mixture at substantially 5-10 min intervals and placed in multi-well plates to measure the fluorescence in the cells. Capture of particles by mucus resulted in sedimentation of the particles and clearing of the suspension.

Removal of Particles from Wastewater Using Jellyfish Mucus

Figure 7A:
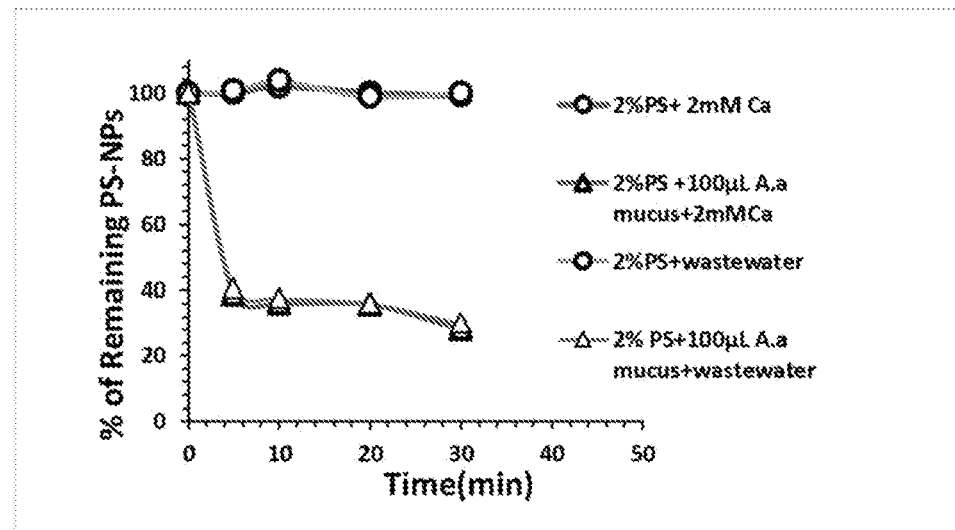
FIGS. 7A-B show kinetics of removal of different types of nanoplastic particles in water, synthetic wastewater and real wastewater with jellyfish mucus.
Figure 7B:
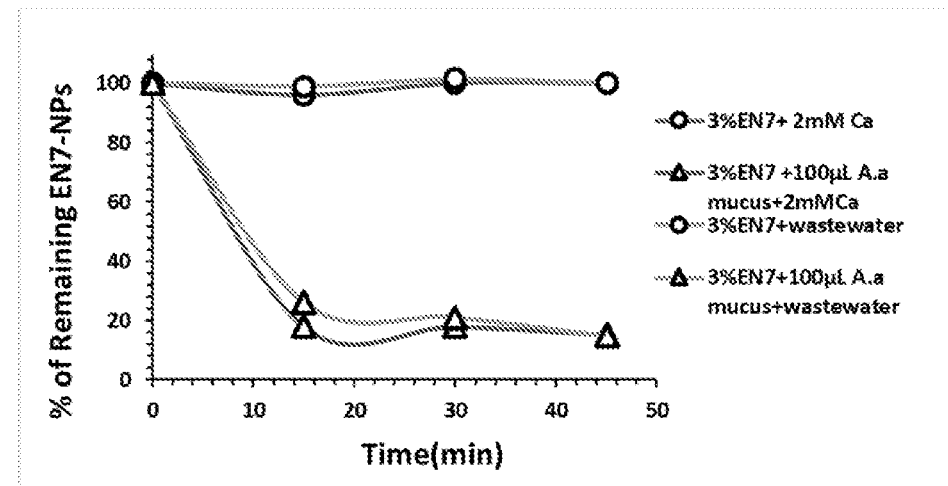

Referring now to FIGS. 7A-B showing kinetics of removal of different types of nanoplastic particles in water, synthetic wastewater and real wastewater with jellyfish mucus. FIG. 7A shows results of an experiment in which substantially 100 μl A.a. was added to water containing PS and the suspension was vortexed for substantially 10-15 seconds. Removal of substantially 60-70% of PS was observed after substantially 5 minutes. Results with synthetic wastewater and real wastewater were identical.

FIG. 7B shows the results of a similar experiment using EN7 particles (hydrophobic nanoparticles). The observation for removal, namely settling, of EN7 was almost immediate (less than substantially 5 minutes), but because of technical issues, the first sample was taken at substantially 12 minutes. This figure indicates removal of more than substantially 85% (substantially 87%) of EN7 for both synthetic wastewater and real wastewater.

Comparison of Jellyfish Mucus with Commercial Coagulating-Flocculating Agents

Figure 8A:
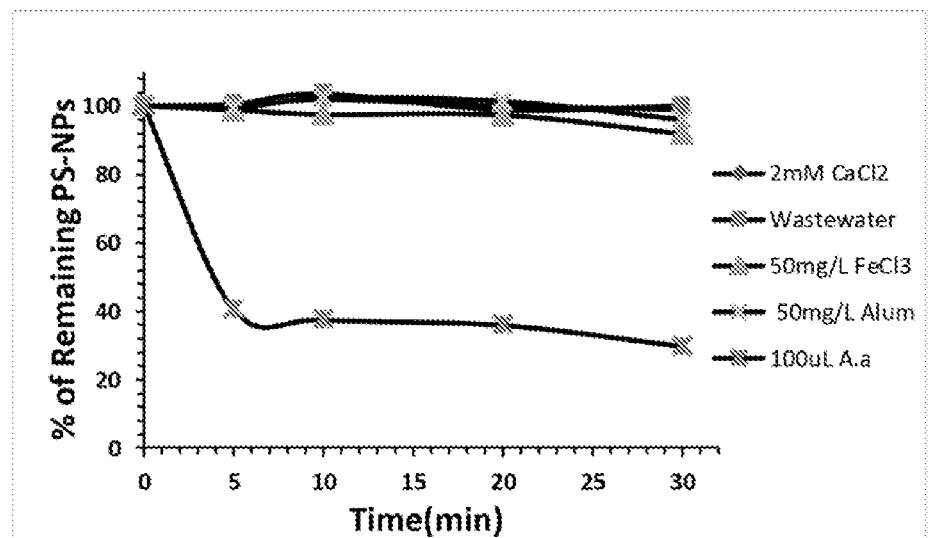
FIGS. 8A-B show kinetics of removal of particles with jellyfish mucus compared to commercial coagulating-flocculating agents.
Figure 8B:
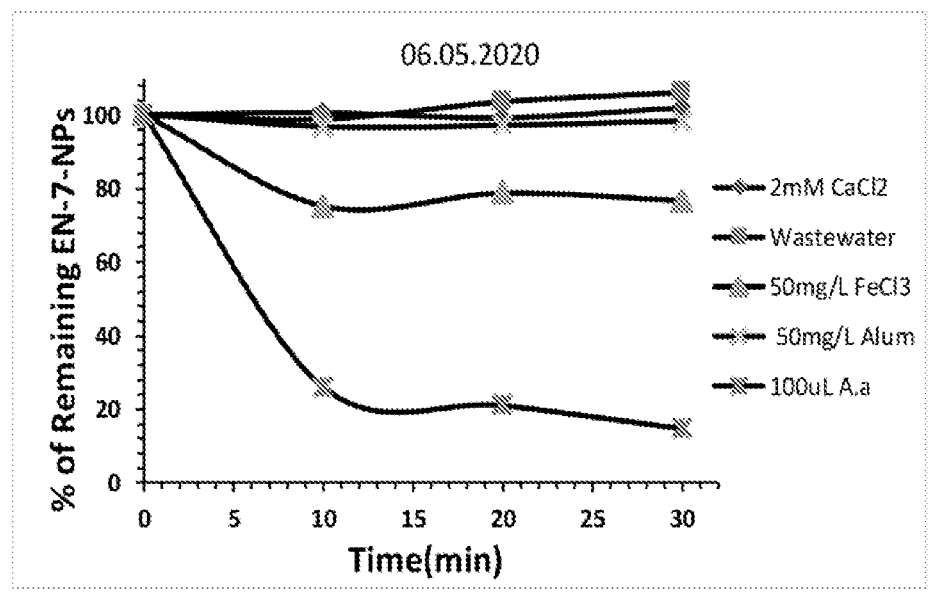

Referring now to FIGS. 8A-B showing kinetics of removal of particles with jellyfish mucus compared to commercial coagulating-flocculating agents. FIG. 8A shows results of removal of PS from water. It is obvious that substantially 50 mg/L of either ferric chloride or alum did not contribute to the removal of PS compared to substantially 65-70% removal using mucus of A.a.

FIG. 8B shows results of removal of EN7 from water. Commercial coagulating-flocculating agents induced a slight reduction in EN7 concentration (substantially 22%), but the efficiency of mucus of A.a. was much higher (more than substantially 80%).

Figure 9A:
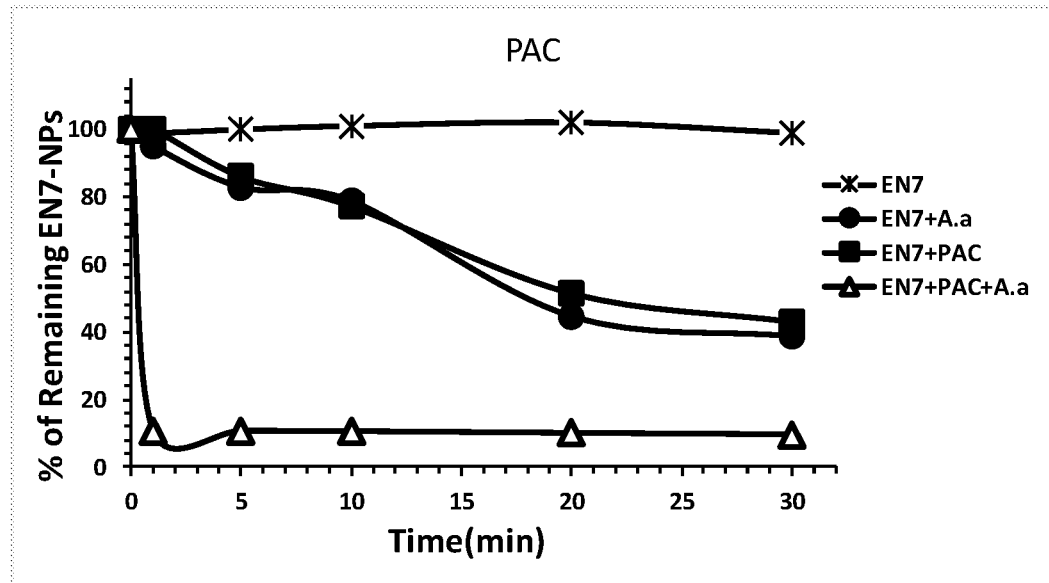
FIGS. 9A-D show removal of particles from water with various combinations of jellyfish mucus and commercial coagulating-flocculating agents.
Figure 9B:
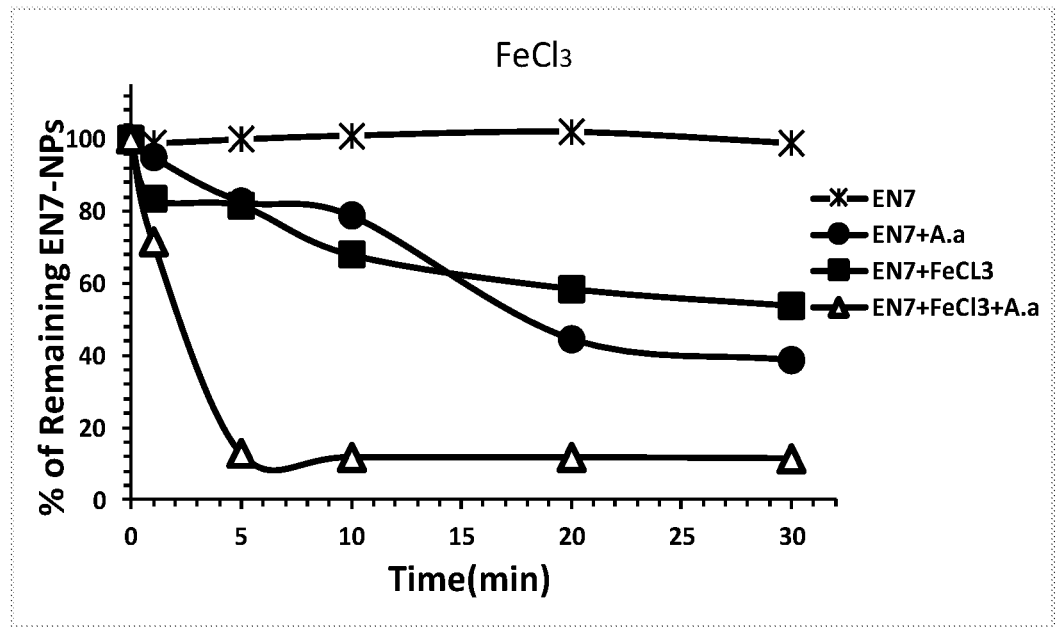
Figure 9C:
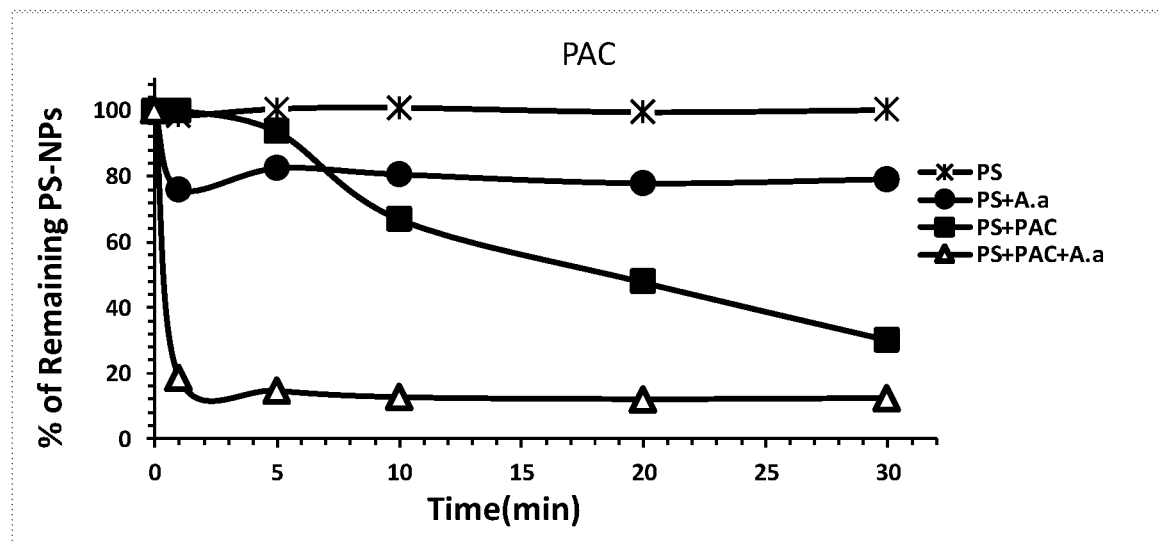
Figure 9D:
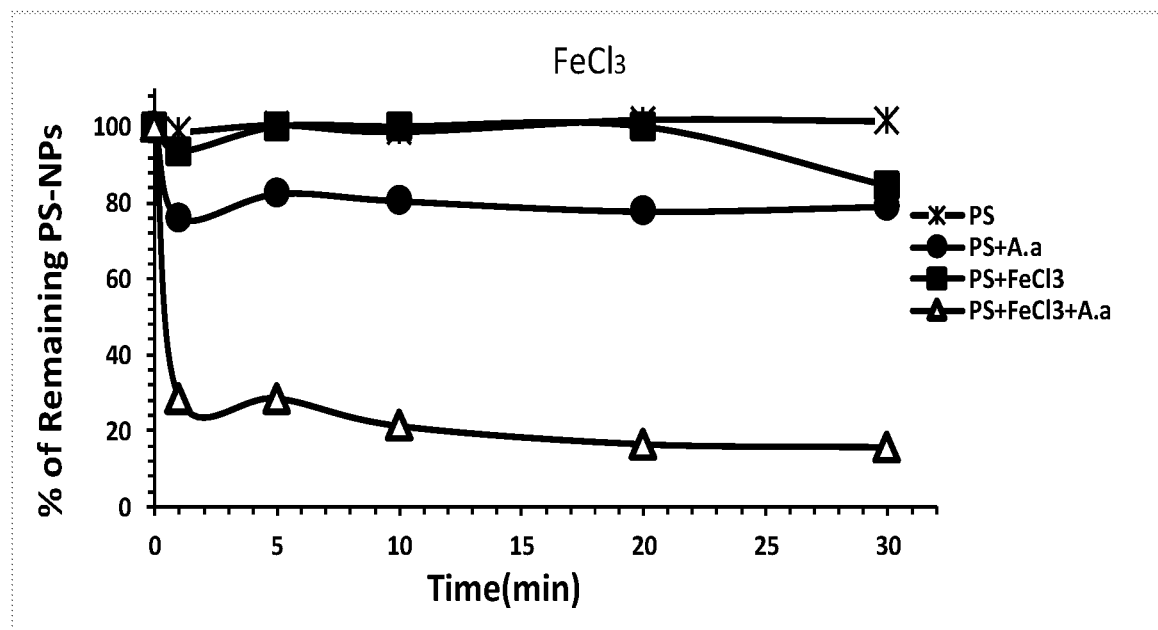
Figure 10:
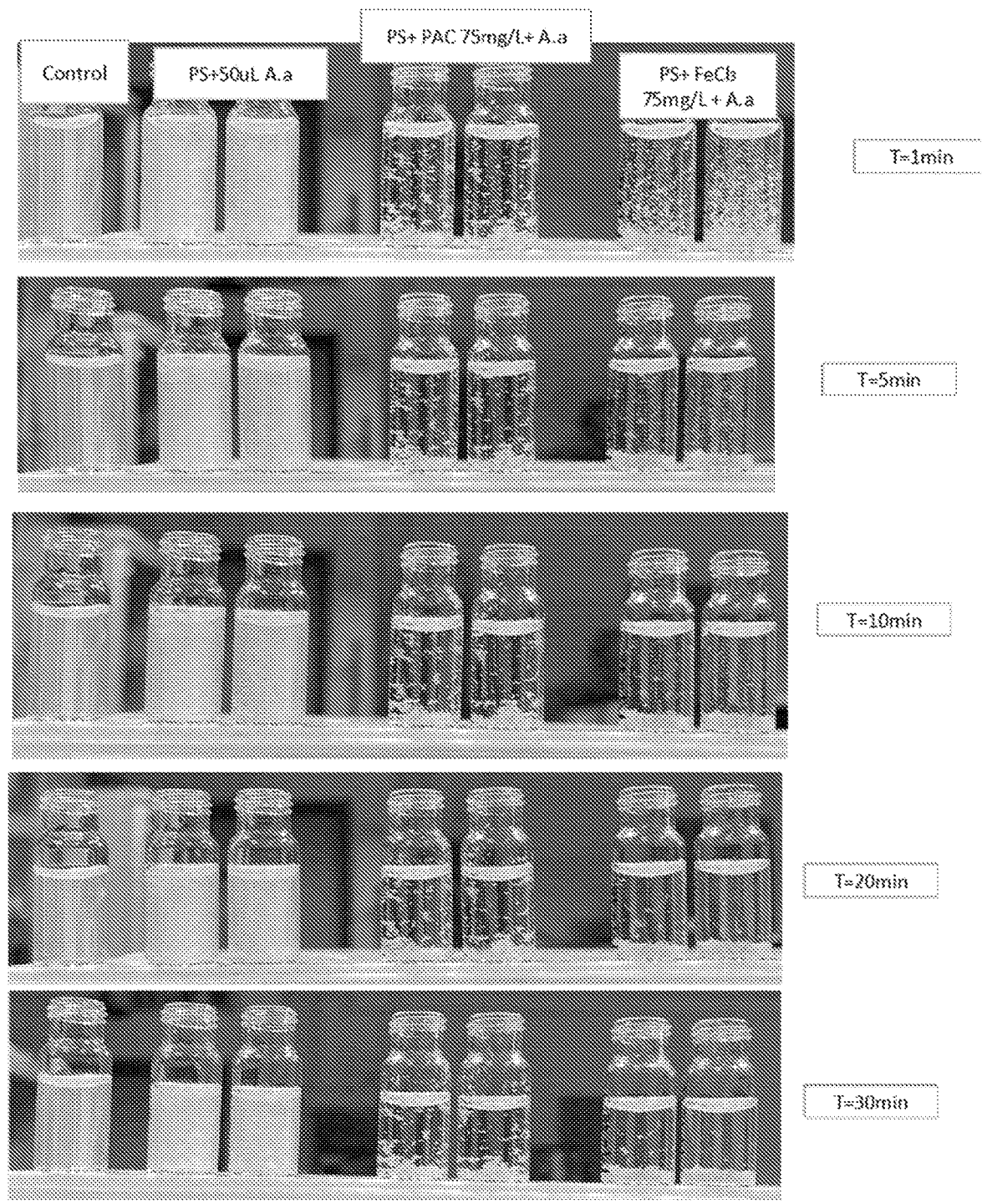
FIG. 10 shows photographs of the vials from the experiment described FIGS. 9A-D.

Synergism of Jellyfish Mucus and Commercial Coagulating-Flocculating Agents in Removal of Particles from Water Referring now to FIGS. 9A-D showing removal of particles from water with various combinations of jellyfish mucus and commercial coagulating-flocculating agents; and to FIG. 10 showing photographs of the vials from the experiment described in FIGS. 9A-D. In FIG. 9A, removal of EN7 was tested with either substantially 75 mg/L PAC, or substantially 0.1 ml A.a. mucus, or a combination of substantially 75 mg/L PAC+substantially 0.1 ml A.a. mucus. PAC alone and A.a. mucus alone removed EN7 similarly from water. However, a combination of PAC and A.a. mucus has a surprising effect of high synergism in terms of removal efficiency (substantially >95%) and in terms of kinetics, where the removal of the EN7 was immediately observed as can be seen in FIG. 9A and in FIG. 10.

In FIG. 9B, removal of EN7 was tested with either 75 mg/L ferric chloride, or substantially 0.1 ml A.a. mucus, or a combination of substantially 75 mg/L ferric chloride+substantially 0.1 ml A.a. mucus. A surprising effect of a combination of ferric chloride and A.a. mucus in removing EN7 from water is shown in FIGS. 9B and 10, similarly to the combination of PAC and A.a. mucus, shown in FIG. 9A.

In FIG. 9C, removal of PS was tested with either substantially 75 mg/L PAC, or substantially 0.05 ml A.a. mucus, or a combination of substantially 75 mg/L PAC+substantially 0.05 ml A.a. mucus. In this experiment, the removal efficiency of PS and the immediate response when combining the commercial coagulating-flocculating agents with A.a. mucus was observed with substantially 50% of the A.a. mucus dose, compared to the results of the experiments shown in FIGS. 9A-B. This means that the combination leads to a reduction in the optimal dose of the A.a. mucus as a result of a strong synergistic effect.

In FIG. 9D, removal of PS was tested with either substantially 75 mg/L ferric chloride, or substantially 0.05 ml A.a. mucus, or a combination of substantially 75 mg/L ferric chloride+substantially 0.05 ml A.a. mucus. The results of this experiment are similar to the results of the experiment shown in FIG. 9C.

Figure 11:
FIG. 11 show a setup of an experiment for removal of particle aggregates with jellyfish mucus in a rapid sand filtration column.

Removal of Aggregates of Particles with Jellyfish Mucus from Water Using a Rapid Sand Filtration Column Referring now to FIG. 11 showing a setup of an experiment for removal of particle aggregates with jellyfish mucus in a rapid sand filtration column. In order to determine whether sand alone can remove PS from water, substantially 100 ml of substantially 1% PS suspension was passed through the rapid sand filtration column at a flow rate of substantially 18 ml/min, while taking samples of feed (suspension before filtration) and effluent (suspension after filtration) for fluorescence measurements. There was no difference between the fluorescence of the feed and the fluorescence of the effluent, suggesting that the rapid sand filtration column alone is ineffective in removing the particles from water.

Figures 12A, 12B:
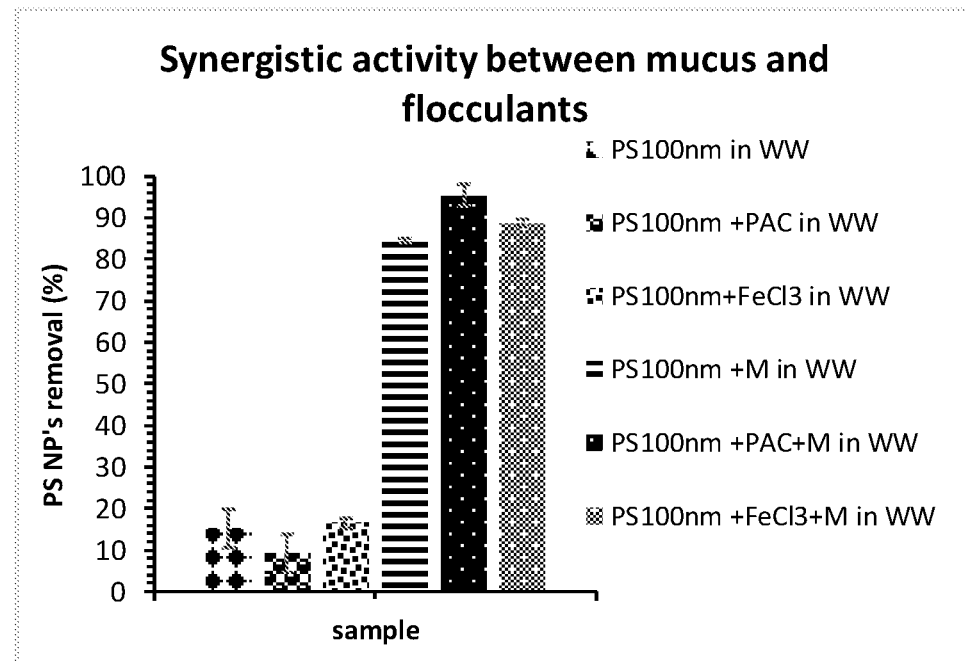
FIGS. 12A-B show results of removal of particles from water by interaction of the particles with either commercial coagulating-flocculating agents, or jellyfish mucus, or combinations thereof, followed by rapid sand filtration.

Referring now to FIGS. 12A-B showing results of removal of particles from real wastewater by interaction of the particles with either commercial coagulating-flocculating agents, or jellyfish mucus, or combinations thereof, followed by rapid sand filtration. FIG. 12A shows removal of PS (substantially 100 nm) with either PAC, or ferric chloride, or A.a. mucus, or combinations thereof. FIG. 12B shows removal of EN7 (substantially 100 nm) with either PAC, or ferric chloride, or A.a. mucus, or combinations thereof.

In the experiment shown in FIG. 12A, real wastewater was spiked with substantially 1% 100 nm PS. To the spiked real wastewater, A.a. (Eilat) mucus, or coagulating-flocculating agents, or combinations thereof, were added, mixed for 30 seconds with a magnetic stirrer, and then injected into the rapid sand filtration column. Maximal removal of the spiked fluorescent inform the wastewater was substantially 15%, while the coagulating-flocculating agents (substantially 75 mg/L PAC, or $FeCl_3$) were ineffective in removing PS (below substantially 10% with PAC, and substantially 15% with $FeCl_3$). However, A.a. mucus achieved substantially 84% removal of PS, while a combination of A.a. mucus with PAC resulted in substantially 95% removal of PS, and A.a. mucus combined with ferric chloride resulted in substantially 89% removal of PS.

The experiment shown in FIG. 12B is similar to the experiment shown in FIG. 12A, except that the particles were EN7. A.a. mucus achieved a removal of substantially 80% of EN7, and A.a. mucus+PAC achieved a removal of substantially 81% of EN7. PAC alone was ineffective in removing EN7, and was similar to the negative controls (without jellyfish mucus or coagulating-flocculating agent). Similarly, poor removal of EN7 by ferric chloride was also noted (substantially 10%).

FIGS. 12A-B provide a solid evidence for highly effective ability of jellyfish mucus, alone, or in combination with a coagulating-flocculating agent, to remove particles (both PS and EN7) from a liquid medium, compared to coagulating-flocculating agents (PAC and $FeCl_3$) alone.

Figure 13:
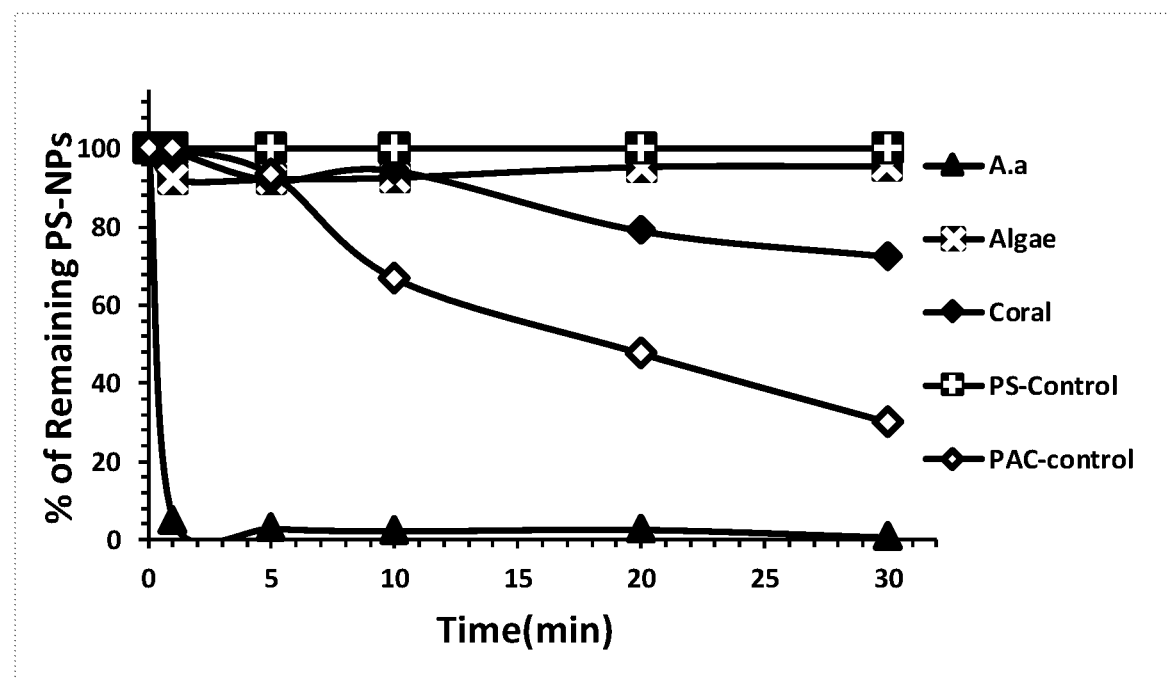
FIG. 13 shows removal of particles from an aqueous medium using mucus from three different sources: jellyfish, corals and algae.
Figure 14:
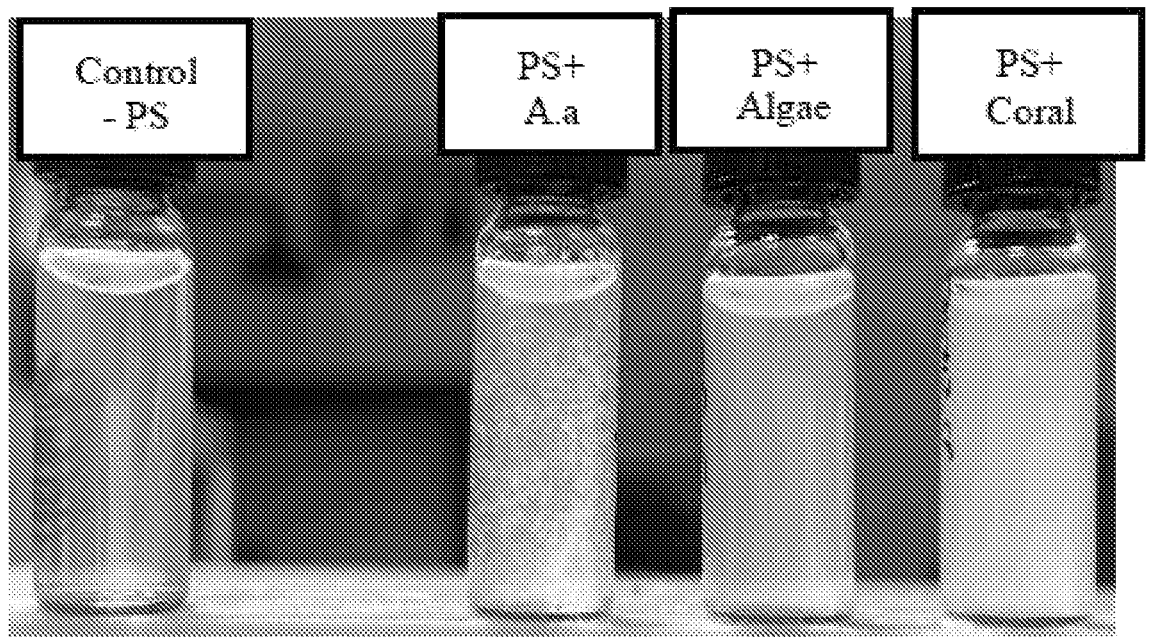
FIG. 14 shows photographs of the vials from the experiment described in FIG. 13.

Removal of Particles from an Aqueous Medium Using Mucus from Jellyfish, Corals and Algae Referring now to FIG. 13 showing removal of particles from an aqueous medium using mucus from three different sources: jellyfish, corals and algae; and to FIG. 14 showing photographs of the vials from the experiment described in FIG. 13. FIG. 13 shows removal of PS from an aqueous medium using mucus from jellyfish, coral and algal sources, as well as by PAC. This experiment shows that removal of particles from water is preferably achieved using jellyfish mucus, while coral and algal mucus did not cause a significant removal of particles from the aqueous medium. In addition, it is evident that while the removal efficiency of particles from water using the coagulating-flocculating agent PAC is relatively high, the coagulating-flocculating agent is much less effective compared to jellyfish mucus. FIG. 14 supports these findings, apart from the effect of PAC, which not included in FIG. 14.

Figure 15A:
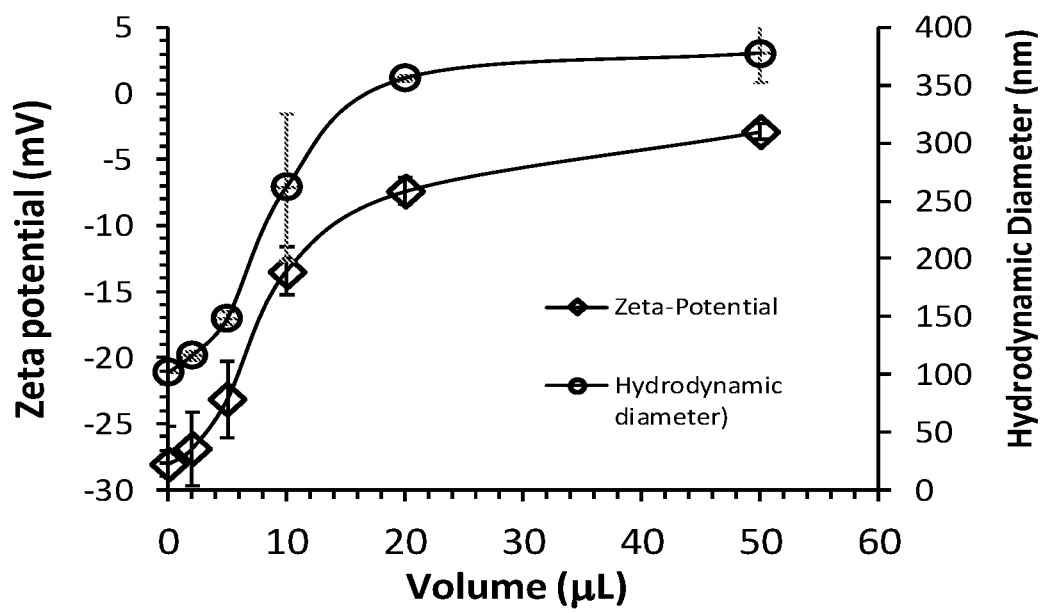
FIGS. 15A-D show zeta potentials and hydrodynamic diameters of particles with various doses and types of mucus.

Referring now to FIGS. 15A-D showing zeta potentials and hydrodynamic diameters of particles with various doses and types of mucus. FIG. 15A shows Zeta potential and hydrodynamic diameter of substantially 0.1% PS with different doses of A.a. mucus. The above mentioned results were supported with dynamic light scattering (DLS) for zeta-potential and hydrodynamic dimeter tests. These tests show that addition of A.a. mucus leads to a significant decrease in zeta potential (within one subsequent to a quick vortex) indicating that a rapid and strong interaction between the mucus and the NPs occurred leading to a significant reduction of the zeta potential. This reduction of the zeta-potential can explain the rapid aggregation of the PS-A.a. mucus complex as can be seen in FIG. 14 (second vial from left), and the increase of the hydrodynamic diameter (aggregate) as can be seen in FIG. 15A.

Figure 15B:
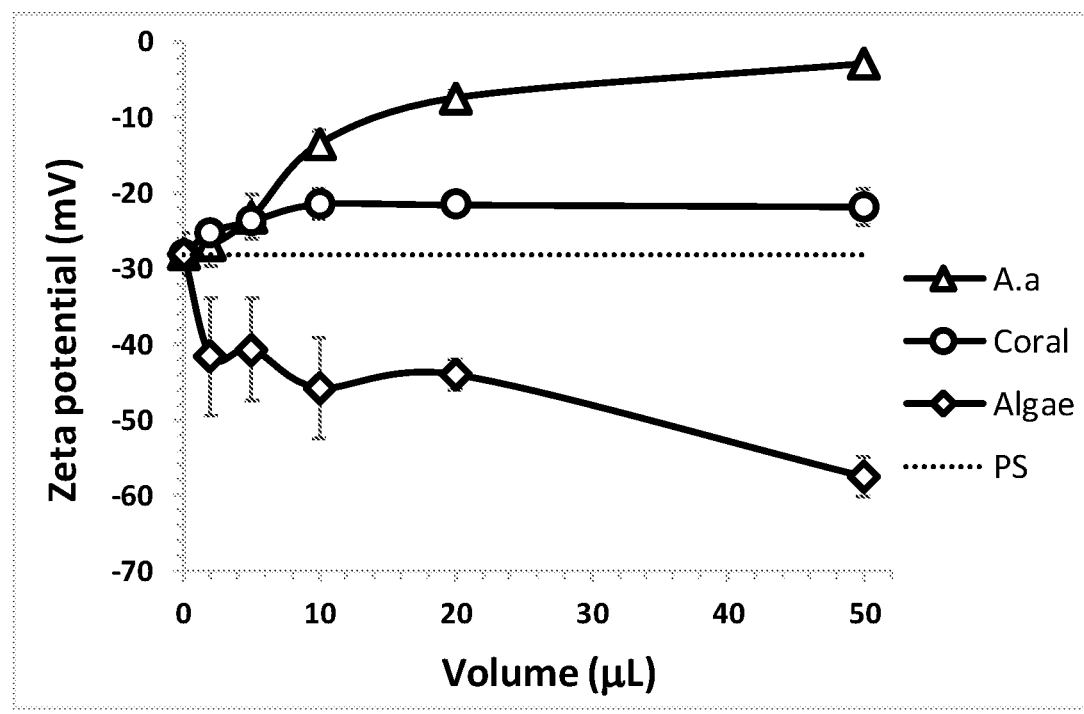

FIG. 15B shows the change of the zeta potential of PS-NPs (0.1%) in response to different doses of mucus from A.a., coral and algal origin. The dashed line refers to the "control" PS-NPs suspension without mucus). FIG. 15B further shows that addition of coral mucus altered the zeta potential very slightly (from substantially −28 to −21.3 mV), while the addition of algal mucus significantly increased the zeta potential (from substantially −28 mV to substantially −54 mV).

Figure 15C:
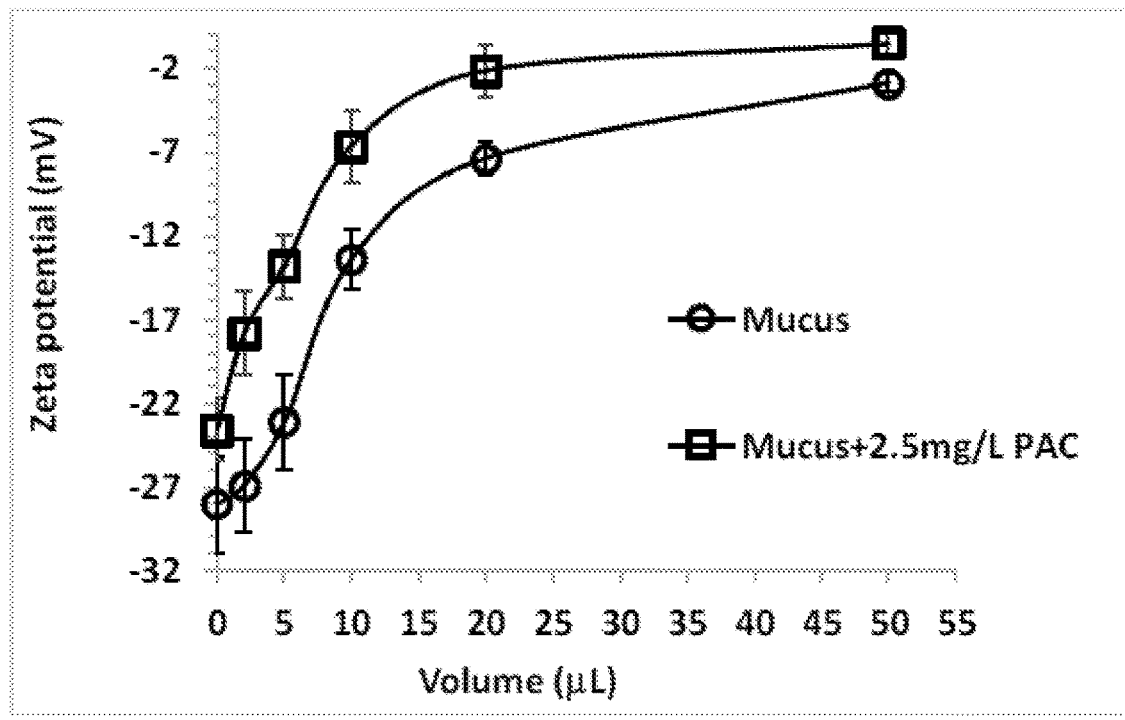
Figure 15D:
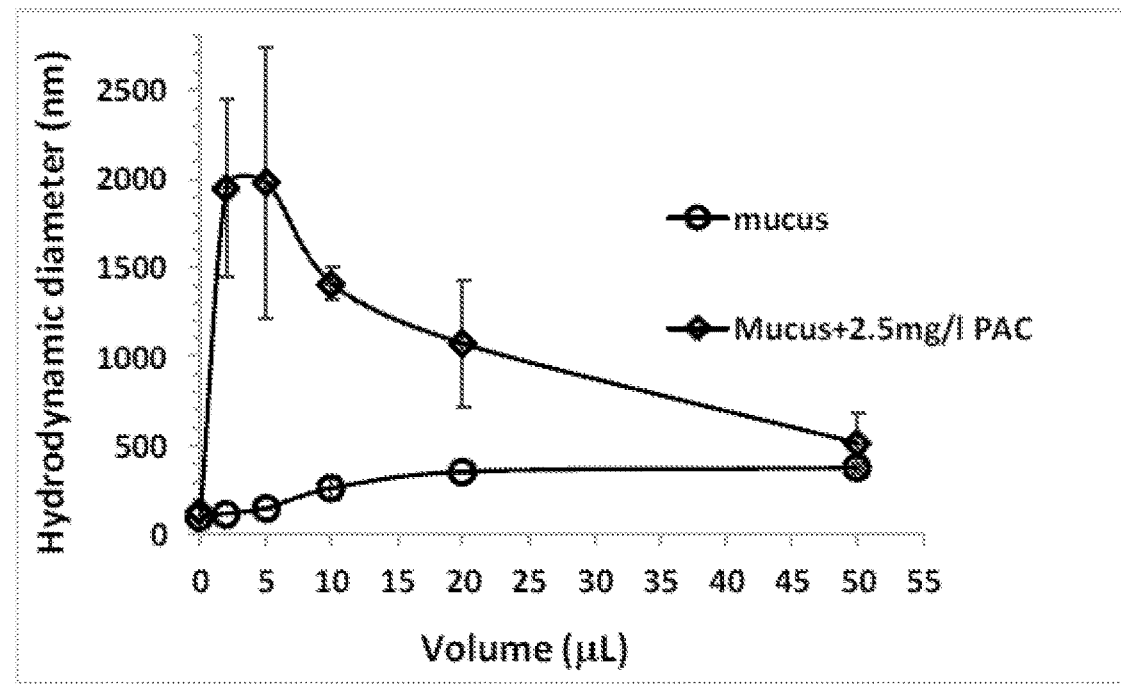

FIG. 15C show the zeta potential, and FIG. 15D shows the hydrodynamic diameter of PS NPs (substantially 0.1%) in response to different doses of A.a. mucus alone or in combination with 2.5 mg/L PAC. FIG. 15C-D describe the synergistic effect between the mucus and PAC. Here, combining PAC with A.a. mucus led to a rapid aggregation with the PS-NPs at the lower dose range resulting from both a rapid reduction of the repulsion energy (zeta potential) and a rapid growth of the hydrodynamic diameter. Importantly, FIG. 15D shows a rapid reduction in the hydrodynamic diameter post the optimum dose (substantially 5 μl mucus with substantially 2.5 mg/L PAC). This result suggests that the aggregation process clearly depends on the surface area (concentration of NPs) of the NPs that is available for interactions for both mucus and PAC.

Results of Rapid Sand Filtration of Water with Nanoplastic Particles Treated with Jellyfish Mucus The results of the rapid sand filtration of water with nanoplastic particles treated with jellyfish mucus are shown in Table 1.

TABLE 1

| # | Unit | MRL* | Lab/Pilot Scale | IN PS-NPs | Out PS-NPs | Out PS-NPs + Mucus | Out PS-NPs + Mucus + FeCl$_3$ | 1$^{st}$ Backwash (PS-NPs + Mucus) | 2$^{nd}$ Backwash (PS-NPs + Mucus) |
|---|------|------|-----------------|-----------|------------|--------------------|-------------------------------|-----------------------------------|-----------------------------------|
| 1 | ppm | 0.01 | Lab Scale | 0.040 | 0.040 | 0.013 | — | <MRL* | <MRL* |

*Method reporting limit (MRL)

In the lab-scale system, when only polystyrene nanoparticles (PS-NPs), in the concentration of 0.040 ppm entered the column, a similar concentration of PS-NPs (0.040 ppm) was detected in the water exited the column (Out), indicating that column itself did not remove PS-NPs from the water. However, in the presence of jellyfish mucus, the concentration of PS-NPs that exited the column was 0.013 ppm, indicating a removal rate of 67.5% of the PS-NPs with the jellyfish mucus. However, when a combination of jellyfish mucus and ferric chloride (FeCl$_3$) was introduced to the water containing 0.040 ppm PS-NPs, no PS-NPs were detected in the water that exited the column.

This result shows a high removal rate (67.5%) of PS-NPs from water with jellyfish mucus; but more surprisingly, shows again that a combination of jellyfish mucus and a coagulating-flocculating agent (ferric chloride) has a much better removal rate of PS-NPs from water (100%) compared to jellyfish mucus alone.

It is appreciated that certain features of the subject matter, which are, for clarity, described in the context of separate embodiments, may also be provided in combination in a single embodiment. Conversely, various features of the subject matter, which are, for brevity, described in the context of a single embodiment, may also be provided separately or in any suitable sub combination.

Although the subject matter has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A system for removing particles from water, the system comprising:
    a reactor configured to allow interaction of gelatinous zooplankton mucus with particles in water comprising particles and as a result further allowing generation of particle aggregates in the water;
    a water input fluidically connected to the reactor, and configured to supply water comprising particles to the reactor;
    a mucus input fluidically connected to the reactor, and configured to supply gelatinous zooplankton mucus to the water comprising particles in the reactor;
    a water pipe fluidically connected to the reactor, and configured to allow exit of water comprising particle aggregates from the reactor;
    a filter fluidically connected to the water pipe, and configured to receive water comprising particle aggregates from the water pipe and further filter the water; and
    a filtered water pipe fluidically connected to the filter, and configured to allow exit of filtered water from the filter.

2. The system of claim 1, wherein the reactor further comprising a mixing element configured to mix the water comprising particles and the gelatinous zooplankton mucus.

3. The system of claim 1, wherein the filter comprising a filtering element configured to allow passage of filtered water through the filtering element, while eliminating passage of particle aggregates through the filtering element.

4. The system of claim 1, wherein the particles are selected from the group consisting of: microparticles, nanoparticles, nanoplastics, and any combination thereof.

5. The system of claim 1, wherein the gelatinous zooplankton mucus is extracted from a gelatinous zooplankton, wherein the gelatinous zooplankton is selected from the group consisting of: tunticates, comb jellies, jellyfish and any combination thereof.

6. The system of claim 1, wherein the gelatinous zooplankton mucus is extracted from a gelatinous zooplankton, wherein the gelatinous zooplankton is selected from the group consisting of: jellyfish *Aurelia* sp. (A.a.), *Rhopilema nomadica* (R.n.), and a combination thereof.

7. The system of claim 1, wherein at least one coagulating-flocculating agent is provided to the water comprising particles in the reactor, in order to allow formation of particle aggregates in the water in the reactor by allowing interaction between the particles in the water and the gelatinous zooplankton mucus and the at least one coagulating-flocculating agent.

8. The system of claim 7, wherein the coagulating-flocculating agent is polyaluminum chloride (PAC).

9. The system of claim 7, wherein the coagulating-flocculating agent is ferric chloride.

10. The system of claim 7, wherein the coagulating-flocculating agent is selected from the group consisting of: PAC, ferric chloride, and a combination thereof.

11. A method for removing particles from water, the method comprising:
    providing a reactor configured to allow interaction of gelatinous zooplankton mucus with particles in water comprising particles and as a result further allowing generation of particle aggregates in the water;
    supplying water comprising particles to the reactor through a water input fluidically connected to the reactor, and configured to supply water comprising particles to the reactor;
    supplying gelatinous zooplankton mucus to the reactor through a mucus input fluidically connected to the reactor, and configured to supply gelatinous zooplankton mucus to the water comprising particles in the reactor;

allowing formation of particle aggregates in the water in the reactor by allowing interaction between the particles in the water and the gelatinous zooplankton mucus;

exiting water comprising particle aggregates from the reactor through a water pipe fluidically connected to the reactor, and configured to allow exit of water comprising particle aggregates from the reactor;

removing the particle aggregates from the water by passing the water comprising particle aggregates through a filter fluidically connected to the water pipe, and configured to receive water comprising particle aggregates from the water pipe and further filter the water; and exiting filtered water from the filter through a filtered water pipe fluidically connected to the filter, and configured to allow exit of filtered water from the filter.

12. The method of claim 11, wherein the particles are selected from the group consisting of: microparticles, nanoparticles, nanoplastics, and any combination thereof.

13. The method of claim 11, wherein the water comprising particles is treated wastewater comprising particles.

14. The method of claim 11, wherein the gelatinous zooplankton mucus is extracted from a gelatinous zooplankton, wherein the gelatinous zooplankton is selected from the group consisting of: tunticates, comb jellies, jellyfish and any combination thereof.

15. The method of claim 11, wherein the gelatinous zooplankton mucus is extracted from a gelatinous zooplankton, wherein the gelatinous zooplankton is selected from the group consisting of: jellyfish *Aurelia* sp. (A.a.), *Rhopilema nomadica* (R.n.), and a combination thereof.

16. The method of claim 11, wherein the gelatinous zooplankton mucus is extracted from at least one species of gelatinous zooplankton.

17. The method of claim 11, further comprising providing at least one coagulating-flocculating agent to water comprising particles in the reactor, and allowing formation of particle aggregates in the water in the reactor by allowing interaction between the particles in the water and the gelatinous zooplankton mucus and the at least one coagulating-flocculating agent.

18. The method of claim 17, wherein the coagulating-flocculating agent is polyaluminum chloride (PAC).

19. The method of claim 17, wherein the coagulating-flocculating agent is ferric chloride.

20. The method of claim 17, wherein the coagulating-flocculating agent is selected from the group consisting of: PAC, ferric chloride, and a combination thereof.

* * * * *